US012795111B2

(12) United States Patent
Pang et al.

(10) Patent No.: US 12,795,111 B2
(45) Date of Patent: Nov. 10, 2026

(54) RATE CONTROL FOR POINT CLOUD CODING WITH A HYPERPRIOR MODEL

(71) Applicant: InterDigital VC Holdings, Inc., Wilmington, DE (US)

(72) Inventors: Jiahao Pang, Plainsboro, NJ (US); Muhammad Asad Lodhi, Highland Park, NJ (US); Junghyun Ahn, New York, NY (US); Dong Tian, Boxborough, MA (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 18/654,987

(22) Filed: May 3, 2024

(65) Prior Publication Data

US 2025/0343920 A1 Nov. 6, 2025

(51) Int. Cl.

| | |
|---|---|
| ***H04N 19/147*** | (2014.01) |
| ***H04N 19/13*** | (2014.01) |
| ***H04N 19/136*** | (2014.01) |
| ***H04N 19/30*** | (2014.01) |
| ***H04N 19/42*** | (2014.01) |
| ***H04N 19/597*** | (2014.01) |

(52) U.S. Cl.

CPC ........... *H04N 19/147* (2014.11); *H04N 19/13* (2014.11); *H04N 19/136* (2014.11); *H04N 19/30* (2014.11); *H04N 19/42* (2014.11); *H04N 19/597* (2014.11)

(58) Field of Classification Search

CPC .... H04N 19/147; H04N 19/13; H04N 19/136; H04N 19/30; H04N 19/42; H04N 19/597

See application file for complete search history.

(56) References Cited

U.S. PATENT DOCUMENTS

2024/0007658 A1* 1/2024 Mao ..................... G06N 3/0464
2024/0144520 A1* 5/2024 Gori .......................... G06T 7/73
2024/0144623 A1* 5/2024 Gori .......................... G06T 7/70
2025/0005331 A1 1/2025 Mikhailovich
(Continued)

FOREIGN PATENT DOCUMENTS

WO 2023113917 A1 6/2023
WO 2023132919 A1 7/2023
(Continued)

OTHER PUBLICATIONS

Zhihao Duan et al., "Balancing the encoder and decoder complexity in image compression for classification", SpringerOpen, EURASIP Journal on Image and Video Processing © The Authors (2024) (Year: 2024).*

(Continued)

*Primary Examiner* — Dramos Kalapodas

(74) *Attorney, Agent, or Firm* — Klintworth & Rozenblat LLP

(57) ABSTRACT

Some embodiments of a method may include: obtaining a feature bitstream; decoding a first feature map from the feature bitstream based on the decoded distribution parameters; obtaining a rate-distortion trade-off parameter; updating the first feature map to obtain a second feature map, wherein updating the first feature map comprises performing an adaptive affine process on the first feature map according to the rate-distortion trade-off parameter; decoding a point cloud from the second feature map; and outputting the point cloud.

21 Claims, 17 Drawing Sheets

(56) References Cited

U.S. PATENT DOCUMENTS

| | | | | |
|---|---|---|---|---|
| 2025/0139834 | A1* | 5/2025 | Pang | H04N 19/33 |
| 2025/0324089 | A1 | 10/2025 | Jiahao | |

FOREIGN PATENT DOCUMENTS

| | | | | |
|---|---|---|---|---|
| WO | 2023177317 | | 9/2023 | |
| WO | WO-2023172153 | A1 * | 9/2023 | H04N 19/124 |
| WO | WO-2024081133 | A1 * | 4/2024 | G06N 3/09 |
| WO | WO-2025103602 | A1 * | 5/2025 | H04N 19/109 |

OTHER PUBLICATIONS

Elena Camuffo et al., "Recent Advancements in Learning Algorithms for Point Clouds: An Updated View"; Sensors 2022, 22, 1357. https://doi.org/10.3390/s22041357 (Year: 2022).*

Junghyun Ahn et al., "DDA-Net: Deep Distribution-Aware Network for Point Cloud Compression." © 2018 IEEE (Year: 2018).*

International Search Report and Written Opinion of the International Searching Authority for PCT/US2025/026861 mailed Jul. 15, 2025 (11 pages).

Ahn, J., et al., DDA-Net: Deep Distribution-Aware Network for Point Cloud Compression, 2023 IEEE International Symposium on Circuits and Systems (ISCAS) 2023 (5 pages).

Wang, J. et al., "Multiscale point cloud geometry compression." arXiv preprint arXiv:2011.03799, Nov. 2020 (10 pages).

Balle, J. et al., es, "Variational image compression with a scale hyperprior." arXiv preprint arXiv:1802.01436, May 2018 (23 pages).

Ba, J. L. "Layer normalization." arXiv preprint arXiv:1607.06450, Jul. 2016 (14 pages).

Vaswani, A. et al., "Attention is all you need." Advances in neural information processing systems 30 31st Conference on Neural Information Processing Systems (NIPS 2017), Long Beach, CA, USA. 2017 (11 pages).

Duan, Z. et al., "QARV: Quantization-aware resnet VAE for lossy image compression." IEEE Transactions on Pattern Analysis and Machine Intelligence 46, No. 1, Dec. 2023 arXiv e-prints (2023): arXiv-2302 (19 pages).

MPEG Systems "Text of ISO/IEC 23090-14 CDAM 2: Support for Haptics, Augmented Reality, Avatars, Interactivity, MPEG-I Audio, and Lighting" ISO/IEC JTC 1/SC 29WG 03 N00797, Convenorship: KATS, Korea, Mar. 2023 (60 pages).

* cited by examiner

182

1100

RATE CONTROL FOR POINT CLOUD CODING WITH A HYPERPRIOR MODEL

INCORPORATION BY REFERENCE

The present application incorporates by reference in their entirety the following applications: U.S. Non-Provisional patent application Ser. No. 18/637,370, entitled "REPRODUCIBLE LEARNING-BASED PONT CLOUD CODING" and filed Apr. 16, 2024 ("370 application"); International Patent Application Serial No. PCT/US2022/046950, entitled "HYBRID FRAMEWORK FOR POINT CLOUD COMPRESSION" and filed Oct. 18, 2022 ("950 application"); International Patent Application Serial No. PCT/US2022/052861, entitled "SCALABLE FRAMEWORK FOR POINT CLOUD COMPRESSION" and filed Dec. 14, 2022 ("861 application"); and International Patent Application Serial No. PCT/US2023/034393, entitled "SPARSE TENSOR-BASED BITWISE DEEP OCTREE CODING" and filed Oct. 3, 2023 ("393 application"), which claims priority to U.S. Provisional Patent Application Ser. No. 63/415,841 and filed Oct. 13, 2022 ("841 application").

BACKGROUND

The field of point cloud compression and processing aims to develop tools for compression, analysis, interpolation, representation and understanding of point cloud signals.

Point cloud is a universal data format across several business domains from autonomous driving, robotics, AR/VR, civil engineering, computer graphics, to the animation/movie industry. 3D LiDAR sensors have been deployed in self-driving cars, and affordable LiDAR sensors are released from Velodyne Velabit, Apple iPad Pro 2020 and Intel RealSense LiDAR camera L515. With advances in sensing technologies, 3D point cloud data becomes more practical than ever.

SUMMARY

A first example method in accordance with some embodiments may include: obtaining a feature bitstream; decoding a first feature map from the feature bitstream; obtaining a rate-distortion trade-off parameter; updating the first feature map to obtain a second feature map, wherein updating the first feature map includes performing an adaptive affine process on the first feature map according to the rate-distortion trade-off parameter; decoding a point cloud from the second feature map; and outputting the point cloud.

For some embodiments of the first example method, the adaptive affine process further includes scaling values of each respective channel of the first feature map by a scaling factor σ associated with the respective channel.

For some embodiments of the first example method, the adaptive affine process further includes shifting values of each respective channel of the first feature map by a scalar shift m associated with the respective channel.

Some embodiments of the first example method may further include rendering the point cloud in an immersive environment.

For some embodiments of the first example method, updating the first feature map further includes: performing a computation using a neural network layer with the rate-distortion trade-off parameter as an input; and performing a layer normalization process on the first feature map to generate a normalized version of the first feature map, wherein performing the adaptive affine process is performed on the normalized version of the first feature map.

For some embodiments of the first example method, performing the computation using a neural network layer generates, for each channel in the normalized version of the first feature map, a scaler shift m and a scaling factor σ.

Some embodiments of the first example method may further include performing a feature refinement process one or more times, wherein the feature refinement process includes: updating the first refinement feature map to obtain a second refinement feature map, wherein updating the first refinement feature map includes performing an adaptive affine process on the first refinement feature map according to the rate-distortion trade-off parameter; and decoding a third refinement feature map from the second refinement feature map, wherein the first refinement feature map is the first feature map for a first pass through the feature refinement process, and setting the first feature map equal to the third refinement feature map after a last pass through the feature refinement process.

For some embodiments of the first example method, decoding the point cloud from the second feature map includes performing a feature decoding process on the second feature map.

Some embodiments of the first example method may further include: concatenating a reference feature map with the first feature map to generate a concatenated feature map; aggregating the concatenated feature map; and setting the first feature map to be equal to the aggregated feature map.

Some embodiments of the first example method may further include: obtaining a reference point cloud; performing a feature encoding on the reference point cloud to generate a preliminary reference feature map; and performing a reference adaptive affine process on the preliminary reference feature map according to the rate-distortion trade-off parameter, wherein an output of the adaptive affine process is the reference feature map.

For some embodiments of the first example method, the reference adaptive affine process performed on the preliminary reference feature map is identical to the adaptive affine process performed on the first feature map.

A first example apparatus in accordance with some embodiments may include: a processor; and a memory storing instructions operative, when executed by the processor, to cause the apparatus to: obtain a feature bitstream; decode a first feature map from the feature bitstream; obtain a rate-distortion trade-off parameter; update the first feature map to obtain a second feature map, wherein updating the first feature map includes performing an adaptive affine process on the first feature map according to the rate-distortion trade-off parameter; decode a point cloud from the second feature map; and output the point cloud.

A second example method in accordance with some embodiments may include: obtaining a point cloud; extracting a first feature map from the point cloud; obtaining a rate-distortion trade-off parameter; updating the first feature map to obtain a second feature map, wherein updating the first feature map includes performing an adaptive affine process on the first feature map according to the rate-distortion trade-off parameter; encoding the second feature map into a feature bitstream; and outputting the feature bitstream.

For some embodiments of the second example method, updating the first feature map further includes: performing a multi-layer perceptron (MLP) process using the rate-distortion trade-off parameter; and performing a layer normalization process on the first feature map to generate a normalized version of the first feature map, wherein performing the adaptive affine process is performed on the normalized version of the first feature map.

Some embodiments of the second example method may further include: performing a feature refinement process one or more times, wherein the feature refinement process includes: updating the first refinement feature map to obtain a second refinement feature map, wherein updating the first refinement feature map includes performing an adaptive affine process on the first refinement feature map according to the rate-distortion trade-off parameter; and decoding a third refinement feature map from the second refinement feature map, wherein the first refinement feature map is the first feature map for a first pass through the feature refinement process, and setting the first feature map equal to the third refinement feature map after a last pass through the feature refinement process.

For some embodiments of the second example method, extracting a first feature map from the point cloud includes performing a feature encoding process on the point cloud.

Some embodiments of the second example method may further include: concatenating a reference feature map with the second feature map to generate a concatenated feature map; aggregating the concatenated feature map; and setting the second feature map to be equal to the aggregated feature map Some embodiments of the second example method may further include: obtaining a reference point cloud; performing a feature encoding on the reference point cloud to generate a preliminary reference feature map; and performing a reference adaptive affine process on the preliminary reference feature map according to the rate-distortion trade-off parameter, wherein an output of the adaptive affine process is the reference feature map.

For some embodiments of the second example method, the reference adaptive affine process performed on the preliminary reference feature map is identical to the adaptive affine process performed on the first feature map.

For some embodiments of the second example method, applying the hyperprior encoder to the second feature map includes: performing a hyperprior analysis process on the second feature map to generate a third feature map; generating the hyperprior bitstream from the third feature map; performing a hyperprior synthesis process on the third feature map to generate one or more distribution parameters; and arithmetically encoding the second feature map based on the one or more distribution parameters to generate the feature bitstream.

The entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—may only properly be read as being constructively preceded by a clause such as "In at least one embodiment, . . . " For brevity and clarity of presentation, this implied leading clause is not repeated ad nauseum in the detailed description.

DETAILED DESCRIPTION

Figure 1A:
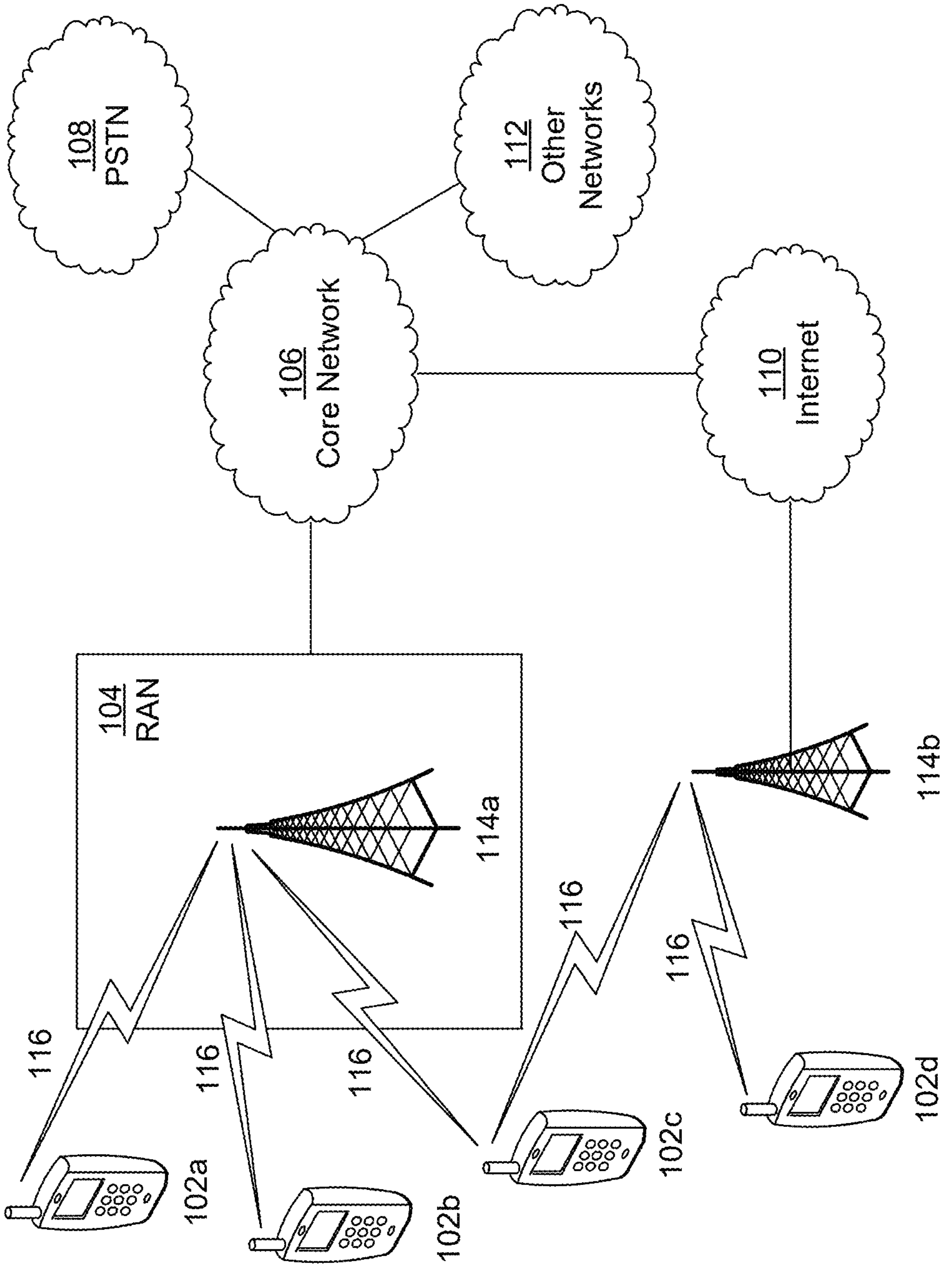
FIG. 1A is a system diagram illustrating an example communications system according to some embodiments.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a RAN 104/113, a CN 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a Node-B, an eNode B, a Home Node B, a Home eNode B, a gNB, a NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., a eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104/113 may be in communication with the CN 106, which may be any type of network configured to provide voice, data, applications, and/or voice over internet protocol (VoIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106 may be in direct or indirect communication with other RANs that employ the same RAT as the RAN 104/113 or a different RAT. For example, in addition to being connected to the RAN 104/113, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
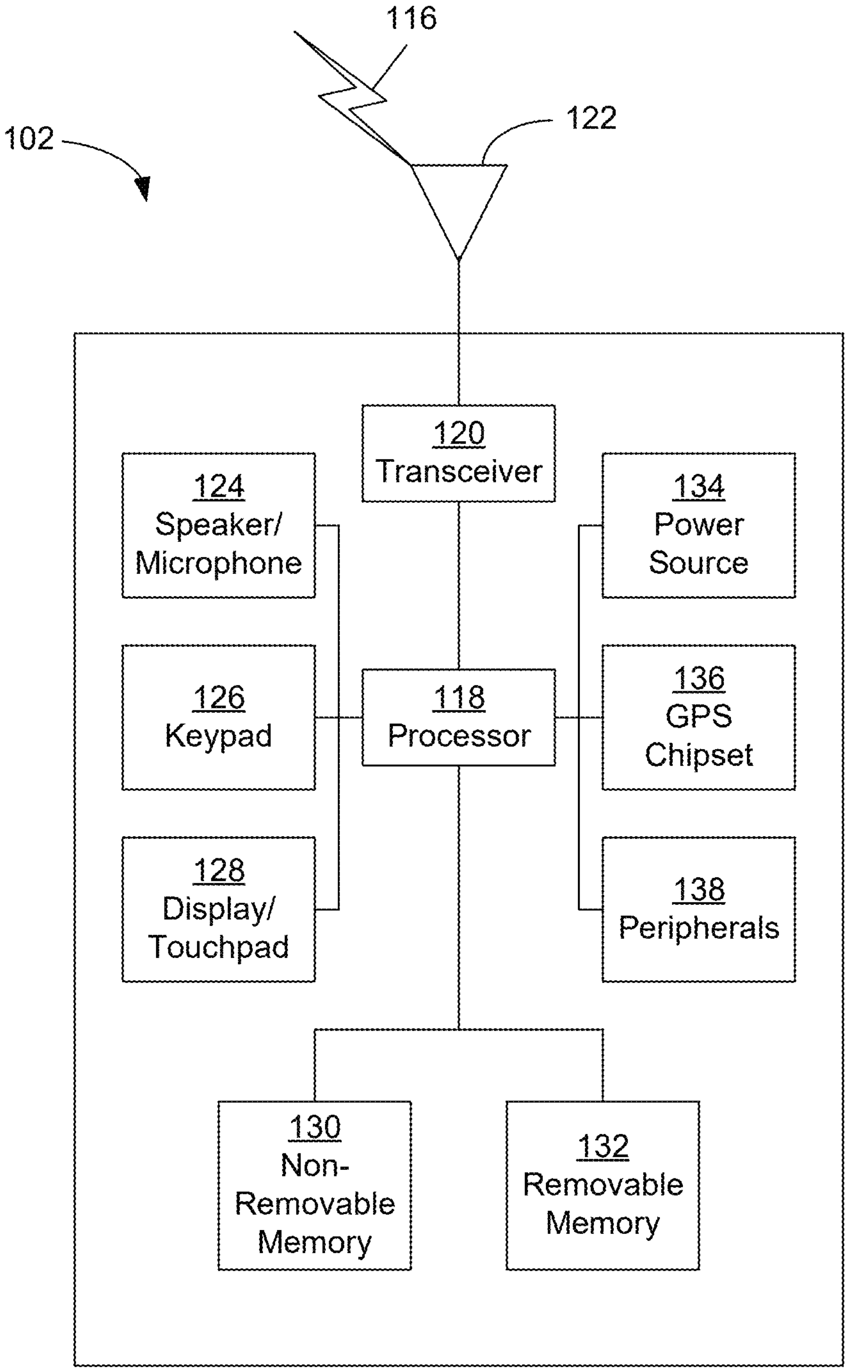
FIG. 1B is a system diagram illustrating an example wireless transmit/receive unit (WTRU) that may be used within the communications system illustrated in FIG. 1A according to some embodiments.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Although the WTRU is described in FIGS. 1A-1B as a wireless terminal, it is contemplated that in certain representative embodiments that such a terminal may use (e.g., temporarily or permanently) wired communication interfaces with the communication network.

In representative embodiments, the other network 112 may be a WLAN.

In view of FIGS. 1A-1B, and the corresponding description, one or more, or all, of the functions described herein may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 1C:
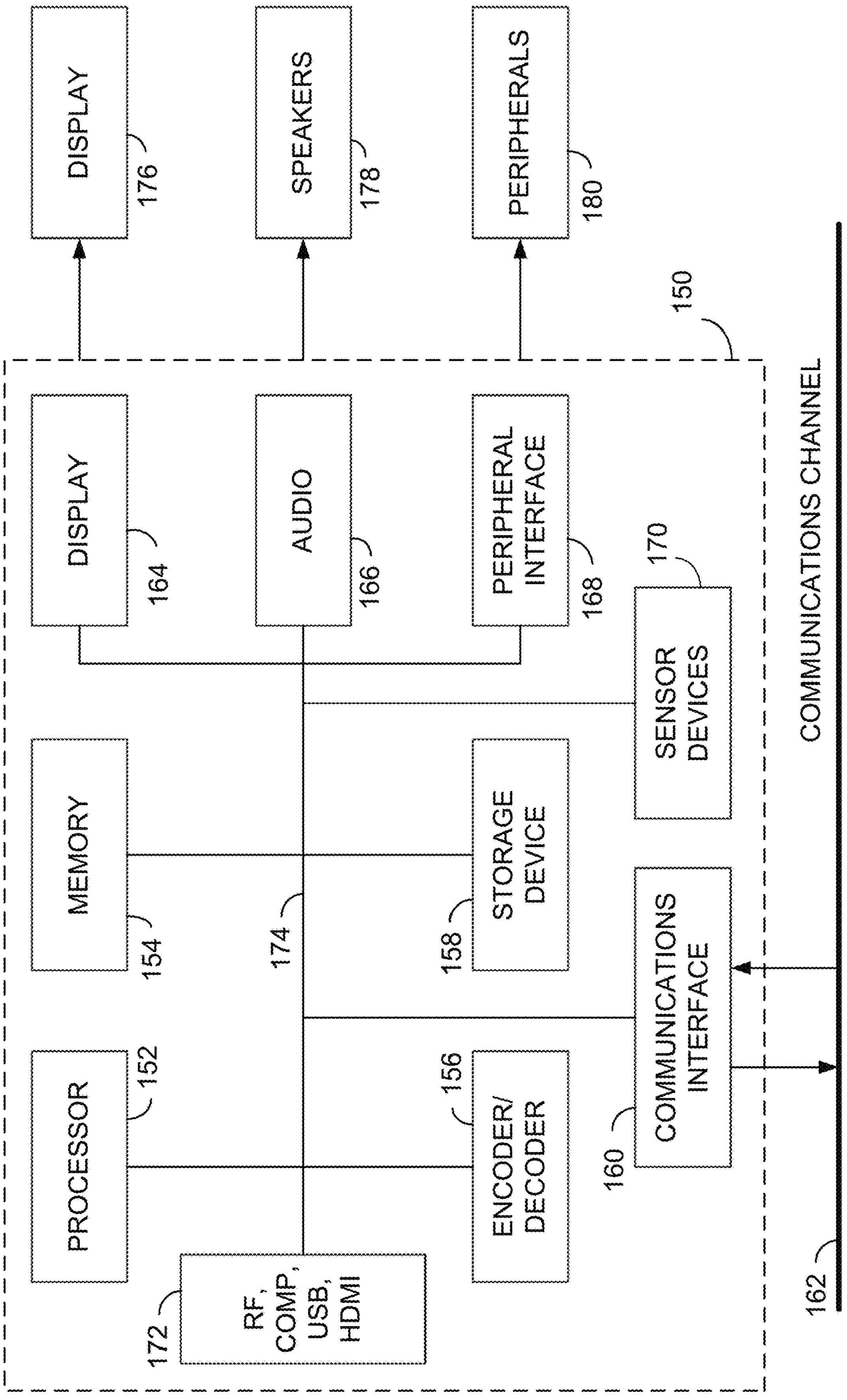
FIG. 1C is a system diagram illustrating an example set of interfaces for a system according to some embodiments.

FIG. 1C is a system diagram illustrating an example set of interfaces for a system according to some embodiments. An extended reality display device, together with its control electronics, may be implemented using a system such as the system of FIG. 1C. System 150 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 150, singly or in combination, can be embodied in a single integrated circuit (IC), multiple ICs, and/or discrete components. For example, in at least one embodiment, the processing and encoder/decoder elements of system 150 are distributed across multiple ICs and/or discrete components. In various embodiments, the system 150 is communicatively coupled to one or more other systems, or other electronic devices, via, for example, a communications bus or through dedicated input and/or output ports. In various embodiments, the system 150 is configured to implement one or more of the aspects described in this document.

The system 150 includes at least one processor 152 configured to execute instructions loaded therein for implementing, for example, the various aspects described in this document. Processor 152 may include embedded memory, input output interface, and various other circuitries as known in the art. The system 150 includes at least one memory 154 (e.g., a volatile memory device, and/or a non-volatile memory device). System 150 may include a storage device 158, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 158 can include an internal storage device, an attached storage device (including detachable and non-detachable storage devices), and/or a network accessible storage device, as non-limiting examples.

System 150 includes an encoder/decoder module 156 configured, for example, to process data to provide an encoded video or decoded video, and the encoder/decoder module 156 can include its own processor and memory. The encoder/decoder module 156 represents module(s) that can be included in a device to perform the encoding and/or decoding functions. As is known, a device can include one or both of the encoding and decoding modules. Additionally, encoder/decoder module 156 can be implemented as a separate element of system 150 or can be incorporated within processor 152 as a combination of hardware and software as known to those skilled in the art.

Program code to be loaded onto processor 152 or encoder/decoder 156 to perform the various aspects described in this document can be stored in storage device 158 and subsequently loaded onto memory 154 for execution by processor 152. In accordance with various embodiments, one or more of processor 152, memory 154, storage device 158, and encoder/decoder module 156 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 152 and/or the encoder/decoder module 156 is used to store instructions and to provide working memory for processing that is needed during encoding or decoding. In other embodiments, however, a memory external to the processing device (for example, the processing device can be either the processor 152 or the encoder/decoder module 152) is used for one or more of these functions. The external memory can be the memory 154 and/or the storage device 158, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 150 can be provided through various input devices as indicated in block 172. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 1C, include composite video.

In various embodiments, the input devices of block 172 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 150 to other electronic devices across USB and/or HDMI connections. It is to be understood that various aspects of input processing, for example, Reed-Solomon error correction, can be implemented, for example, within a separate input processing IC or within processor 152 as necessary. Similarly, aspects of USB or HDMI interface processing can be implemented within separate interface ICs or within processor 152 as necessary. The demodulated, error corrected, and demultiplexed stream is provided to various processing elements, including, for example, processor 152, and encoder/decoder 156 operating in combination with the memory and storage elements to process the datastream as necessary for presentation on an output device.

Various elements of system 150 can be provided within an integrated housing, Within the integrated housing, the various elements can be interconnected and transmit data therebetween using suitable connection arrangement 174, for example, an internal bus as known in the art, including the Inter-IC (12C) bus, wiring, and printed circuit boards.

The system 150 includes communication interface 160 that enables communication with other devices via communication channel 162. The communication interface 160 can include, but is not limited to, a transceiver configured to transmit and to receive data over communication channel 162. The communication interface 160 can include, but is not limited to, a modem or network card and the communication channel 162 can be implemented, for example, within a wired and/or a wireless medium.

Data is streamed, or otherwise provided, to the system 150, in various embodiments, using a wireless network such as a Wi-Fi network, for example IEEE 802.11 (IEEE refers to the Institute of Electrical and Electronics Engineers). The Wi-Fi signal of these embodiments is received over the communications channel 162 and the communications interface 160 which are adapted for Wi-Fi communications. The communications channel 162 of these embodiments is typically connected to an access point or router that provides access to external networks including the Internet for allowing streaming applications and other over-the-top communications. Other embodiments provide streamed data to the system 150 using a set-top box that delivers the data over the HDMI connection of the input block 172. Still other embodiments provide streamed data to the system 150 using the RF connection of the input block 172. As indicated above, various embodiments provide data in a non-streaming manner. Additionally, various embodiments use wireless networks other than Wi-Fi, for example a cellular network or a Bluetooth network.

The system 150 can provide an output signal to various output devices, including a display 176, speakers 178, and other peripheral devices 180. The display 176 of various embodiments includes one or more of, for example, a touchscreen display, an organic light-emitting diode (OLED) display, a curved display, and/or a foldable display. The display 176 can be for a television, a tablet, a laptop, a cell phone (mobile phone), or other device. The display 176 can also be integrated with other components (for example, as in a smart phone), or separate (for example, an external monitor for a laptop). The other peripheral devices 180 include, in various examples of embodiments, one or more of a stand-alone digital video disc (or digital versatile disc) (DVR, for both terms), a disk player, a stereo system, and/or a lighting system. Various embodiments use one or more peripheral devices 180 that provide a function based on the output of the system 150. For example, a disk player performs the function of playing the output of the system 150.

In various embodiments, control signals are communicated between the system 150 and the display 176, speakers 178, or other peripheral devices 180 using signaling such as AV.Link, Consumer Electronics Control (CEC), or other communications protocols that enable device-to-device control with or without user intervention. The output devices can be communicatively coupled to system 150 via dedicated connections through respective interfaces 164, 166, and 168. Alternatively, the output devices can be connected to system 150 using the communications channel 162 via the communications interface 160. The display 176 and speakers 178 can be integrated in a single unit with the other components of system 150 in an electronic device such as, for example, a television. In various embodiments, the display interface 164 includes a display driver, such as, for example, a timing controller (T Con) chip.

The display 176 and speaker 178 can alternatively be separate from one or more of the other components, for example, if the RF portion of input 172 is part of a separate set-top box. In various embodiments in which the display 176 and speakers 178 are external components, the output signal can be provided via dedicated output connections, including, for example, HDMI ports, USB ports, or COMP outputs.

The system 150 may include one or more sensor devices 168. Examples of sensor devices that may be used include one or more GPS sensors, gyroscopic sensors, accelerometers, light sensors, cameras, depth cameras, microphones, and/or magnetometers. Such sensors may be used to determine information such as user's position and orientation. Where the system 150 is used as the control module for an extended reality display (such as control modules 124, 132), the user's position and orientation may be used in determining how to render image data such that the user perceives the correct portion of a virtual object or virtual scene from the correct point of view. In the case of head-mounted display devices, the position and orientation of the device itself may be used to determine the position and orientation of the user for the purpose of rendering virtual content. In the case of other display devices, such as a phone, a tablet, a computer monitor, or a television, other inputs may be used to determine the position and orientation of the user for the purpose of rendering content. For example, a user may select and/or adjust a desired viewpoint and/or viewing direction with the use of a touch screen, keypad or keyboard, trackball, joystick, or other input. Where the display device has sensors such as accelerometers and/or gyroscopes, the viewpoint and orientation used for the purpose of rendering content may be selected and/or adjusted based on motion of the display device.

The embodiments can be carried out by computer software implemented by the processor 152 or by hardware, or by a combination of hardware and software. As a non-limiting example, the embodiments can be implemented by one or more integrated circuits. The memory 154 can be of any type appropriate to the technical environment and can be implemented using any appropriate data storage technology, such as optical memory devices, magnetic memory devices, semiconductor-based memory devices, fixed memory, and removable memory, as non-limiting examples. The processor 152 can be of any type appropriate to the technical environment, and can encompass one or more of microprocessors, general purpose computers, special purpose computers, and processors based on a multi-core architecture, as non-limiting examples.

Scene Description Framework for XR

In some embodiments, examples disclosed herein may be used in the domain of rendering of extended reality scene description and extended reality rendering. For some embodiments, for example, the present application may be applied in the context of the formatting and the playing of extended reality applications when rendered on end-user devices such as mobile devices or Head-Mounted Displays (HMD). For some example embodiments, gITF material may be rendered in a 3D environment that is rendered through a 2D screen. The examples presented herein in accordance with some embodiments are not limited to XR applications.

In XR applications, a scene description is used to combine explicit and easy-to-parse description of a scene structure and some binary representations of media content.

In time-based media streaming, the scene description itself can be time-evolving to provide the relevant virtual content for each sequence of a media stream. For instance, for advertising purpose, a virtual bottle can be displayed during a video sequence where people are drinking.

This kind of behavior can be achieved by relying on the framework defined in the Scene Description for MPEG media document, Information technology—Coded representation of immersive media—Part 14: Scene Description for MPEG media, ISO/IEC DIS 23090-14:2021 (E). A scene update mechanism based on the JSON Patch protocol as defined in IETF RFC 6902 may be used to synchronize virtual content to MPEG media streams.

Figure 1D:
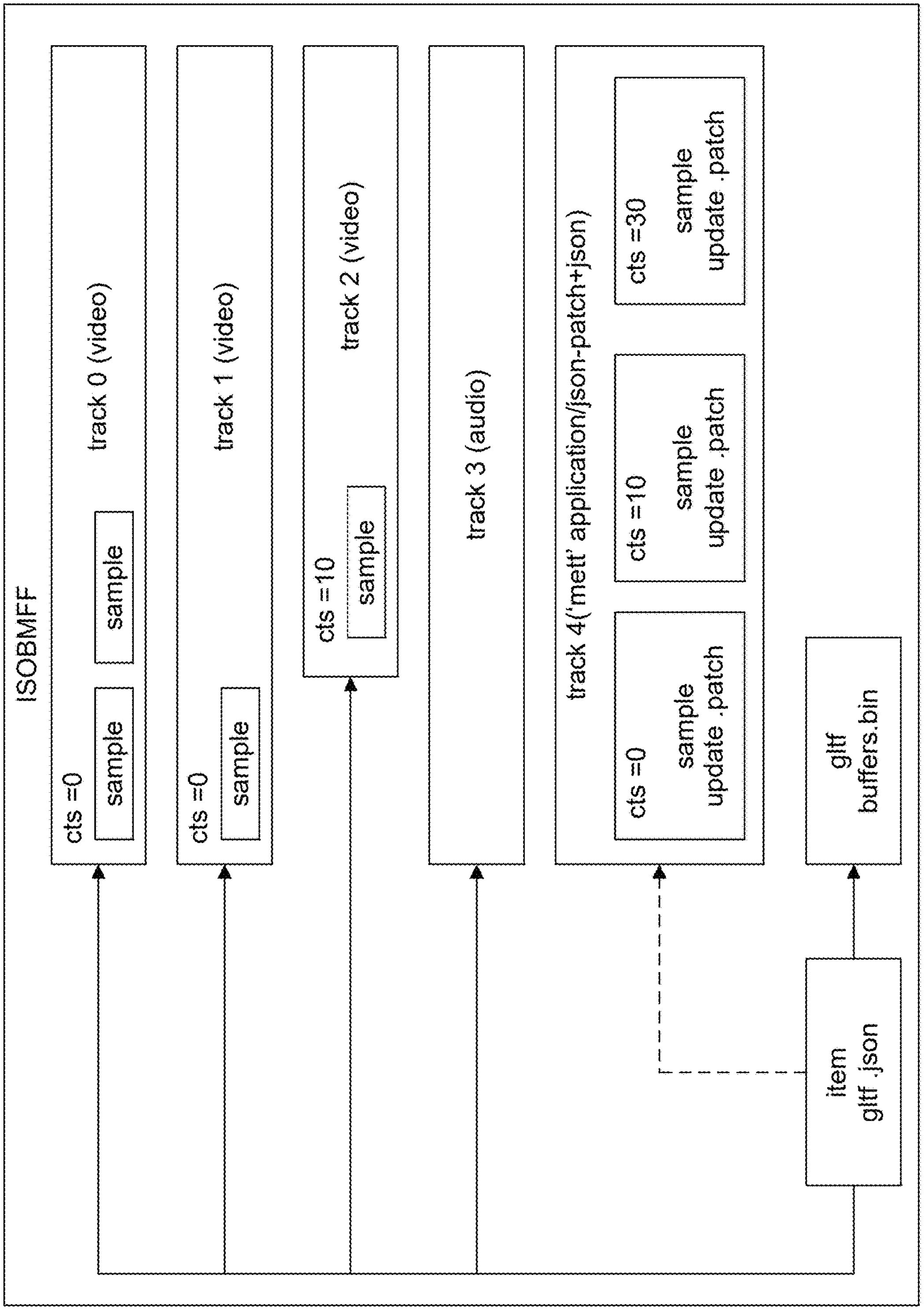
FIG. 1D is a system diagram illustrating an example set of interfaces for a scene description (stored as an item in glTF.json), three video tracks, an audio track, and a JSON patch update track in an ISOBMFF file according to some embodiments.

FIG. 1D is a system diagram illustrating an example set of interfaces for a scene description (stored as an item in gITF.json), three video tracks, an audio track, and a JSON patch update track in an ISOBMFF file 182 according to some embodiments.

Runtime Interactivity

Figure 1E:
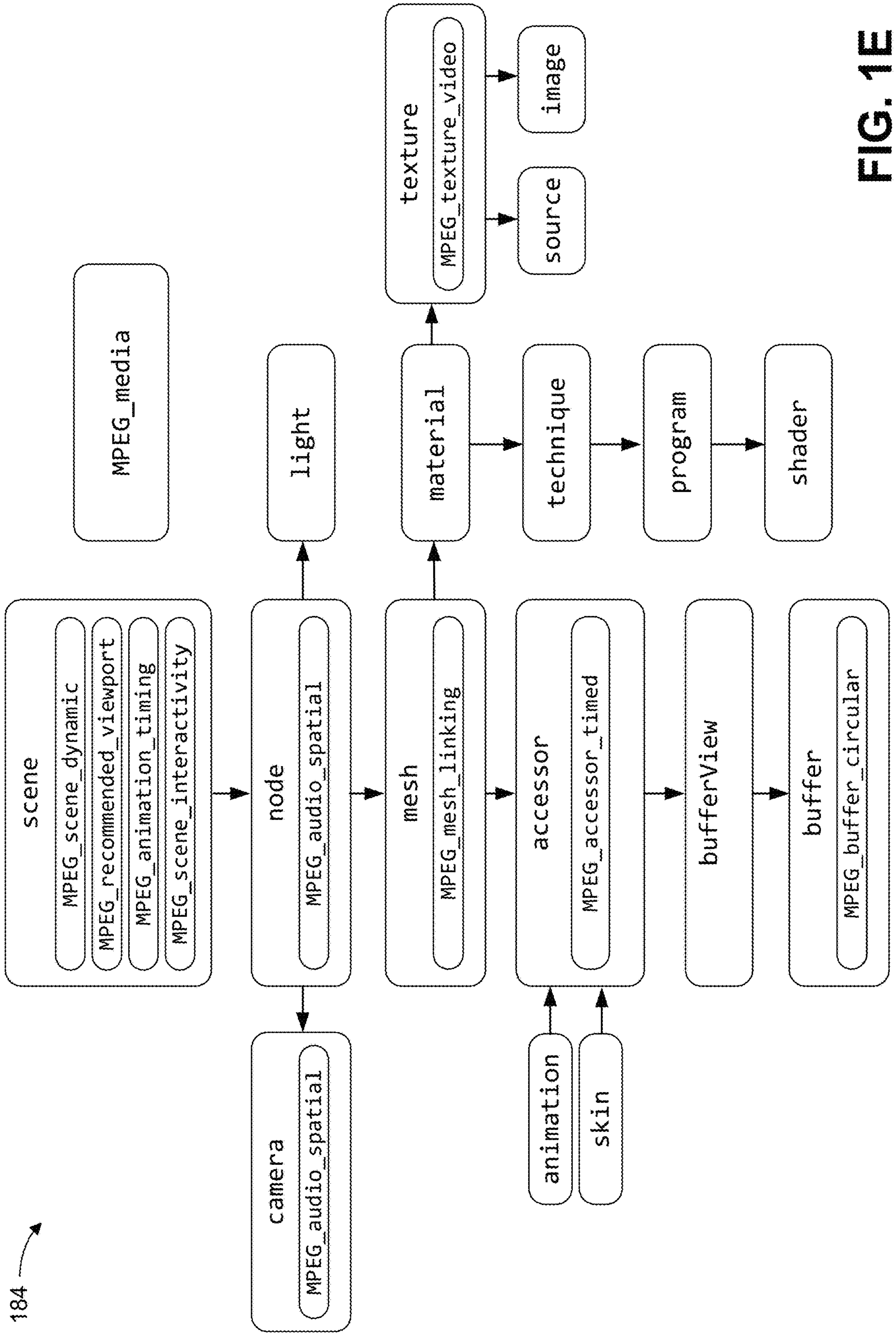
FIG. 1E is a system diagram illustrating an example set of interfaces for an MPEG-I node hierarchy supporting elements of scene interactivity according to some embodiments.

FIG. 1E is a system diagram illustrating an example set of interfaces for an MPEG-I node hierarchy 184 supporting elements of scene interactivity according to some embodiments.

Figure 1F:
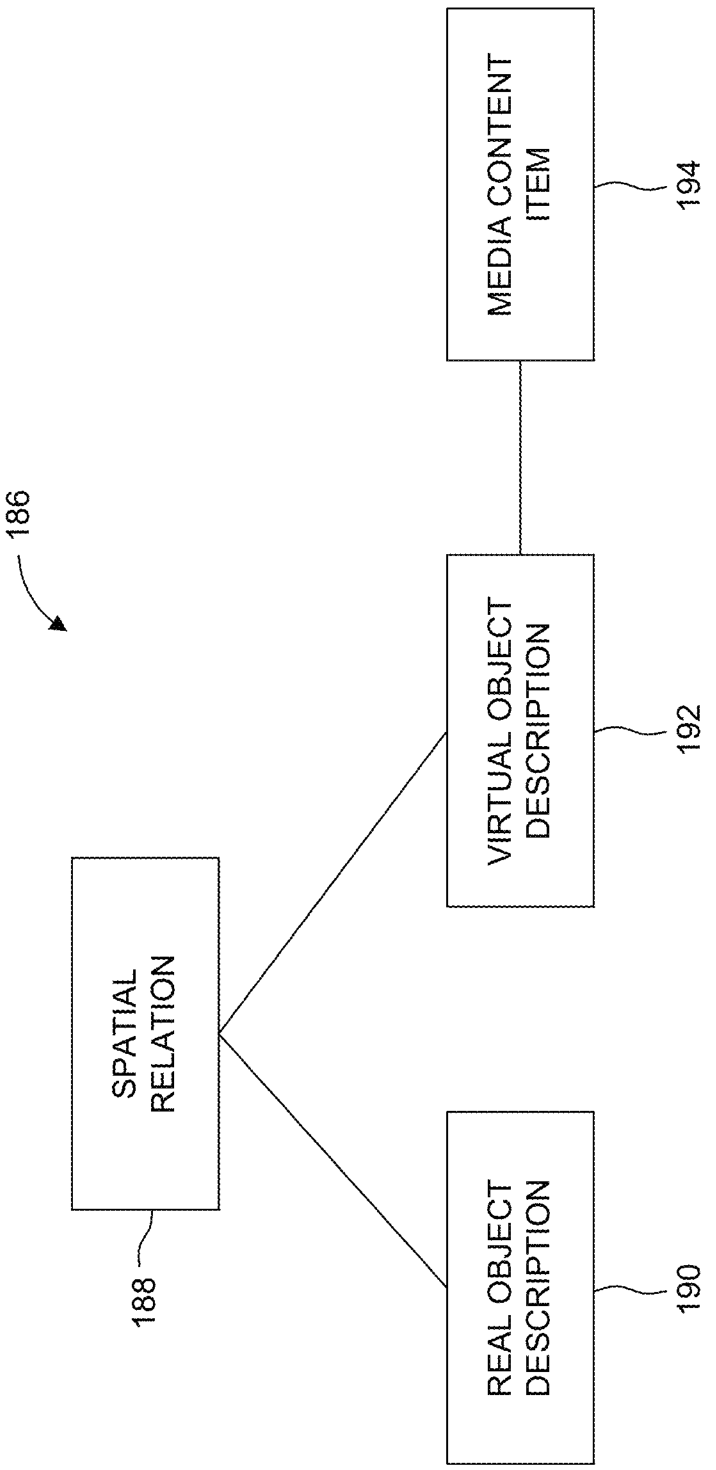
FIG. 1F is a schematic plan view illustrating example relationships of extended reality scene description objects according to some embodiments.

FIG. 1F is a schematic plan view illustrating example relationships of extended reality scene description objects according to some embodiments. In this example, the scene graph 186 includes a description of a real object 190, for example 'plane horizontal surface' (that can be a table or the floor or a plate) and a description of a virtual object 192, for example an animation of a walking character. Scene graph node 192 is associated with a media content item 194 that is the encoding of data used to render and display the walking character (for example as a textured animated 3D mesh). Scene graph 186 also includes a node 188 that is a description of the spatial relation between the real object described in node 190 and the virtual object described in node 192. In this example, node 188 describes a spatial relation to make the character walk on the plane surface. When the XR application is started, media content item 194 is loaded, rendered and buffered to be displayed when triggered. When a plane surface is detected in the real environment by sensors (or a camera for some embodiments), the application displays the buffered media content item as described in node 188. The timing is managed by the application according to features detected in the real environment and to the timing of the animation. A node of a scene graph may also include no description and only play a role of a parent for child nodes.

XR applications are various and may apply to different context and real or virtual environments. For example, in an industrial XR application, a virtual 3D content item (e.g. a piece A of an engine) is displayed when a reference object (piece B of an engine) is detected in the real environment by a camera rigged on a head mounted display device. The 3D content item is positioned in the real-world with a position and a scale defined relative to the detected reference object.

For example, in an XR application for interior design, a 3D model of a furniture is displayed when a given image from the catalog is detected in the input camera view. The 3D content is positioned in the real-world with a position and scale which is defined relative to the detected reference image. In another application, some audio file might start playing when the user enters an area which is close to a church (being real or virtually rendered in the extended real environment). In another example, an ad jingle file may be played when the user sees a can of a given soda in the real environment. In an outdoor gaming application, various virtual characters may appear, depending on the semantics of the scenery which is observed by the user. For example, birds characters are suitable for trees, so if the sensors of the XR device detect real objects described by a semantic label 'tree', birds can be added flying around the trees. In a companion application implemented by smart glasses, a car noise may be launched in the user's headset when a car is detected within the field of view of the user camera, in order to warn him of the potential danger; Furthermore, the sound may be spatialized in order to make it arrive from the direction where the car was detected.

An XR application may also augment a video content rather than a real environment. The video is displayed on a rendering device and virtual objects described in the node tree are overlaid when timed events are detected in the video. In such a context, the node tree includes only virtual objects descriptions.

Example embodiments are described with reference to the scope of the MPEG-I Scene Description framework using the Khronos glTF extension mechanism, which supports additional scene description features, such as a node tree. However, the principles described herein are not limited to a particular scene description framework.

In an example embodiment, the glTF scene description is extended to support interactivity. The interactivity extension applies at the glTF scene level and is called MPEG_scene_interactivity. See the document *ISO/IEC* 23090-14, *CDAM* 2*: Support for Haptics, Augmented Reality, Avatars, Interactivity, MPEG-I Audio, and Lighting*, ISO/IEC JTC 1/SC 29/WG 03 N00797 ("MPEG Extension").

Extended reality (XR) is a technology enabling interactive experiences where the real-world environment and/or a video content is enhanced by virtual content, which can be defined across multiple sensory modalities, including visual, auditory, haptic, etc. During runtime of the application, the virtual content (3D content or audio/video file for example) is rendered in real-time in a way which is consistent with the user context (environment, point of view, device, etc.). Scene graphs (such as the one proposed by Khronos/glTF and its extensions defined in MPEG Scene Description format or Apple/USDZ for instance) are a possible way to represent the content to be rendered. They combine a declarative description of the scene structure linking real-environment objects and virtual objects on one hand, and binary representations of the virtual content on the other hand.

A User Equipment (UE) may correspond to any extended Reality (XR) device/node which may come in variety of form factors. Typical UE (e.g., XR UE) may include, but not limited to the following: Head Mounted Displays (HMD), optical see-through glasses and video see-through HMDs for Augmented Reality (AR) and Mixed Reality (MR), mobile devices with positional tracking and camera, wearables etc. In addition to the above, several different types of XR UE may be envisioned based on XR device functions for e.g., as display, camera, sensors, sensor processing, wireless connectivity, XR/Media processing, and power supply, to be provided by one or more devices, wearables, actuators, controllers and/or accessories. One or more device/nodes/UEs may be grouped into a collaborative XR group for supporting any of XR applications/experience/services.

Point Cloud Data Format

The field of point cloud compression and processing aims to develop tools for compression, analysis, interpolation, representation and understanding of point cloud signals.

Point cloud is a universal data format across several business domains from autonomous driving, robotics, AR/VR, civil engineering, computer graphics, to the animation/movie industry. 3D LiDAR sensors have been deployed in self-driving cars, and affordable LiDAR sensors are released from Velodyne Velabit, Apple iPad Pro 2020 and Intel RealSense LiDAR camera L515. With advances in sensing technologies, 3D point cloud data becomes more practical than ever.

Point cloud data is also believed to consume a large portion of network traffic, e.g., among connected cars over 5G network, and immersive communications (VR/AR). Efficient representation formats may be necessary for point cloud understanding and communication. In particular, raw point cloud data may be organized and processed for the purposes of world modeling & sensing. Compression of raw point clouds may be used when the storage and transmission of the data are used in related scenarios.

Furthermore, point clouds may represent a sequential scan of the same scene, which contains multiple moving objects. They are called dynamic point clouds as compared to static point clouds captured from a static scene or static objects. Dynamic point clouds are typically organized into frames, with different frames being captured at different time. Dynamic point clouds may require the processing and compression to be handled in real-time or with low delay.

Point Cloud Data Use Cases

The automotive industry and autonomous car are domains in which point clouds may be used. Autonomous cars are able to "probe" their environment to make good driving decisions based on the reality of their immediate surroundings. Typical sensors, like LiDARs, produce (dynamic) point clouds that are used by the perception engine. These point clouds are not intended to be viewed by human eyes, and they are typically sparse, not necessarily colored, and dynamic with a high frequency of capture. They may have other attributes, like the reflectance ratio provided by the LiDAR because this attribute may be indicative of the material of the sensed object, and this attribute may help in making a decision.

Virtual Reality (VR) and immersive worlds have become a hot topic and are foreseen by many as the future of 2D flat video. The viewer is immersed in an environment all around the viewer as opposed to standard TV where the viewer may look only at the virtual world in front of the viewer. There are several gradations in the immersivity depending on the freedom of the viewer in the environment. Point clouds are a good format candidate to distribute VR worlds. They may be static or dynamic and are typically of average size, with, e.g., no more than millions of points at a time.

Point clouds also may be used for various purposes, such as cultural heritage/buildings in which objects like statues or buildings are scanned in 3D to share the spatial configuration of the object without sending or visiting the statues or buildings. Also, point clouds offer a way to ensure preservation of the knowledge of the object in case the original object, for instance, is destroyed by an earthquake. Such point clouds are typically static, colored, and huge.

Another use case is in topography and cartography in which using 3D representations, maps are not limited to the plane and may include the relief. Google Maps is a good example of 3D maps but is understood to use meshes instead of point clouds. Nevertheless, point clouds may be a suitable data format for 3D maps, and such point clouds are typically static, colored, and huge.

World modeling and sensing via point clouds may be a technology that allows machines to gain knowledge about the 3D world around them, which may be used by the applications discussed above.

General Challenges 3D point cloud data include discrete samples of the surfaces of objects or scenes. A huge number of points may be used to fully represent the real world with point samples. For instance, a typical VR immersive scene contains millions of points, while point clouds typically contain hundreds of millions of points. Therefore, the processing of such large-scale point clouds may be computationally expensive, especially for consumer devices, such as smartphones, tablets, and automotive navigation systems, that have limited computational power.

The first step for processing or inference on the point cloud is to have efficient storage methodologies. To store and process the input point cloud with affordable computational cost, the point cloud may be down-sampled first, where the down-sampled point cloud summarizes the geometry of the input point cloud while having much fewer points. The down-sampled point cloud may be fed to a machine task for further consumption. However, further reduction in storage space may be achieved by converting the raw point cloud data (original or down sampled) into a bitstream through entropy coding techniques for lossless compression. Better entropy models result in a smaller bitstream and hence more efficient compression. Additionally, the entropy models may be paired with downstream tasks, which allows the entropy encoder to maintain the task-specific information while compressing.

In addition to lossless coding, many scenarios for lossy coding seek significantly improved compression ratios while maintaining the induced distortion under certain quality levels. To achieve a particular bitrate with learning-based lossy point cloud coding, a particular deep neural network model needs to be trained. In other words, to use one neural network model to cover multiple bitrates or to achieve fine-grain, continuous bitrate control may be challenging. However, training multiple models to achieve different rates may take a lot of time and resources, which makes learning-based lossy point cloud coding uneasy to deploy in the real world. This problem is addressed in this application for some embodiments.

Restating things, point cloud compression may be used in many practical applications, such as autonomous driving and AR/VR, among other applications. To achieve a particular bitrate with learning-based point cloud compression, a dedicated neural network model needs to be trained. In other words, to use one neural network alone to achieve fine-grain and continuous bitrate control may be difficult. However, training multiple models to achieve different rates may take a lot of time and resources. Therefore, developing an approach which uses only one model to achieve bitrate control is highly desirable.

Multiscale Point Cloud Geometry Compression

Figure 2A:
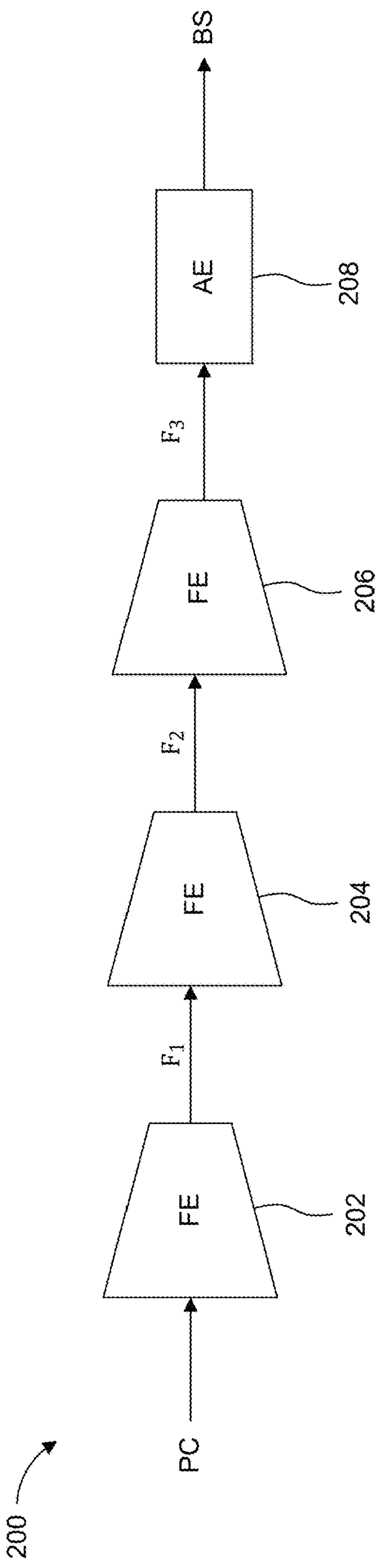
FIG. 2A is a process diagram illustrating an example typical lossy point cloud compression according to some embodiments.
Figure 2B:
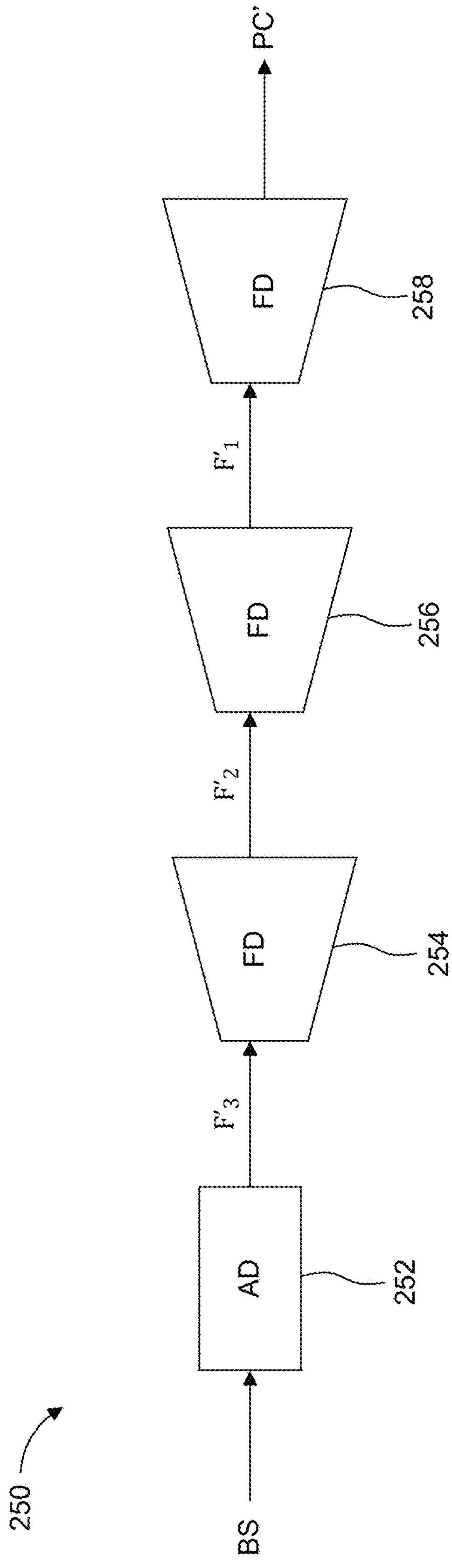
FIG. 2B is a process diagram illustrating an example typical lossy point cloud decompression according to some embodiments.

FIG. 2A is a process diagram illustrating an example typical lossy point cloud compression according to some embodiments. According to Wang, Jianqiang, et al., *Multiscale Point Cloud Geometry Compression,* 2021 IEEE DATA COMPRESSION CONFERENCE (DCC) 73-82 (2021), Point Cloud Geometry Compression (PCGC), version 2, is a typical learning-based point cloud geometry compression scheme. PCGC's basic diagram is shown in FIGS. 2A-2B. For the encoder process 200, an input point cloud (PC) is inputted into a feature extraction block (FE) 202 for two-times downsampling and feature extraction. The FE block 202 is a set of 3D sparse convolutional layers. The output of FE 202 is an abstract, high-level feature map $F_1$. By applying multiple FE blocks 202, 204, 206 sequentially, the output feature map $F_3$ is fed to an arithmetic encoder (AE) 208 for encoding into a bitstream (BS).

FIG. 2B is a process diagram illustrating an example typical lossy point cloud decompression according to some embodiments. For the decoder process 250, the bitstream BS is fed to an arithmetic decoder (AD) 252, which decodes the reconstructed feature map $F'_3$. The reconstructed feature map $F'_3$ is inputted into the feature decoding block (FD) 254 for upsampling and feature aggregation. Similar to the FE block, the FD block is a set of 3D sparse convolutional layers. However, the FD block 254 upsamples the feature map by two-times rather than downsampling it. By applying FD blocks 254, 256, 258 a few times sequentially, the point cloud is decoded (PC').

To train a neural network model for this design, a loss function with both rate and distortion may be used as shown in Eq. 1:

$$L = D + \lambda R \tag{1}$$

where D is the reconstruction error between the input point cloud PC and the decoded point cloud PC', and R is the bitrate of the bitstream BS. The parameter $\lambda > 0$ controls the tradeoff between the rate R and geometry reconstruction error D.

In this design, in order to reach a target bitrate, a particular neural network needs to be trained with a specific choice of λ). For instance, to achieve five different rates, five different neural network models need to be trained individually. This process may be very time-consuming to train many neural network models (each target for a particular rate point) and space-consuming to store that many models. Moreover, finer-grain control over the bitrates (e.g., adjusting the rate continuously) may be impossible. These problems are addressed by this application for some embodiments.

For some embodiments, adjusting the bitrates for lossy point cloud compression is important. Usually, multiple neural network models are used to achieve different rates, which is costly. For this application, only one neural network model is used to achieve rate control. The rate may be controlled continuously by continuously adjusting the rate-distortion tradeoff parameter. A hyperprior model (which encodes the feature map adaptively) may be combined with an adaptive affine transform (which adjusts the quantization adaptively for rate control). Designs described in this application may be applied, for some embodiments, for either voxel-based or point-based neural network architecture and may be applied for either intra- or inter-coding.

Rate Control with Hyperprior Model

Figure 3:
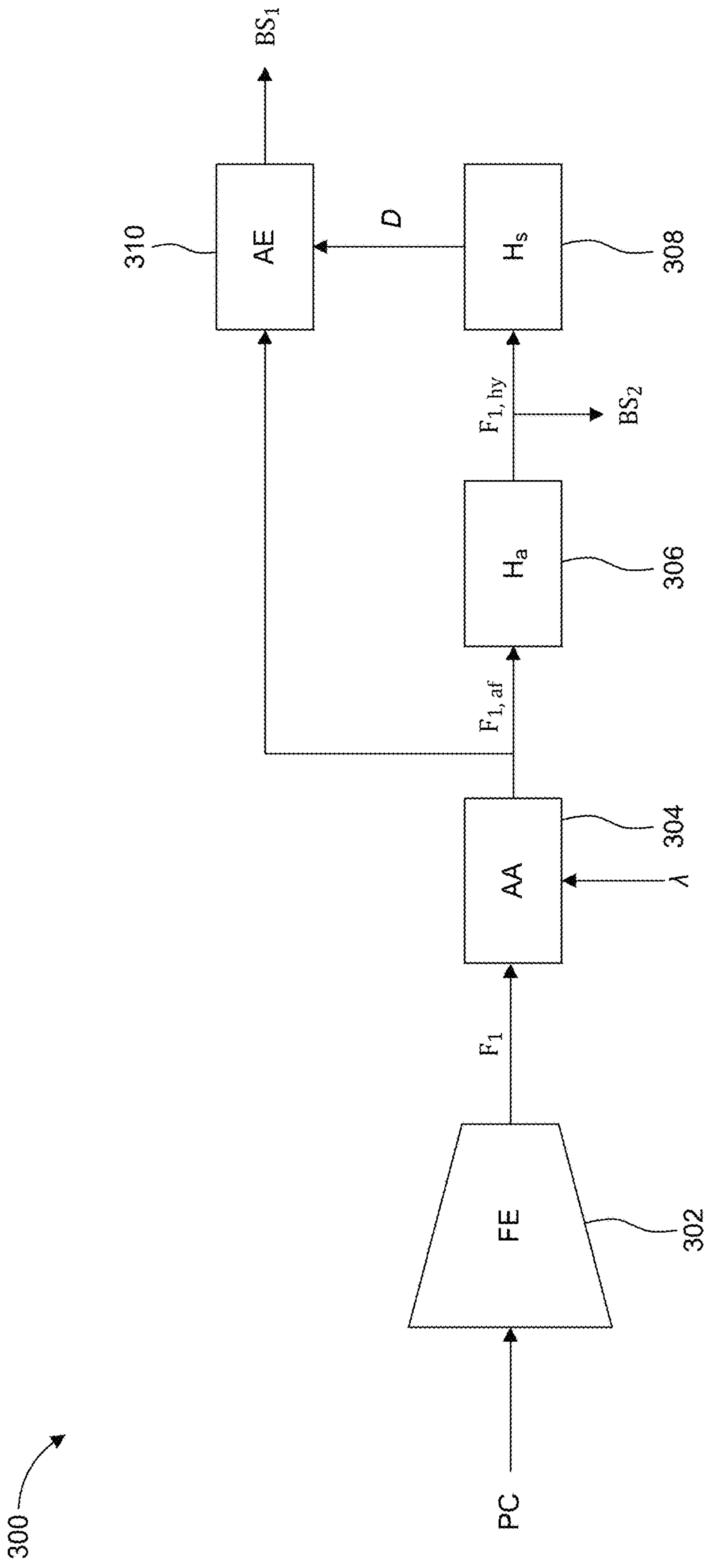
FIG. 3 is a process diagram illustrating an example encoder according to some embodiments.

FIG. 3 is a process diagram illustrating an example encoder according to some embodiments. FIG. 3 shows an example encoder design 300 for a rate control scheme. For simplicity, FIG. 3 shows the case where only one FE block 302 is applied to the input PC to obtain the feature map $F_1$ for entropy coding.

Encoder

Before entropy coding of $F_1$, the values of $F_1$ are adaptively quantized (or scaled) according to the input parameter λ so that the precision/granularity of $F_1$ becomes different given a different λ. Therefore, the final bitstream size is also different. If the input λ is large (which implies that a smaller rate is desired according to Eq. (1), then the feature map $F_1$ is quantized with relatively larger quantization steps. If the input λ is small (which implies that a larger rate and a smaller distortion is desired), then the feature map $F_1$ is quantized with relatively smaller quantization steps. To achieve this purpose, a so-called adaptive affine (AA) block 304 is introduced, and this AA block 304 collaborates with a hyperprior model for adaptive entropy coding.

Particularly, the input feature map $F_1$ is inputted into the AA block 304, in which the AA block 304 also takes an additional input λ. The AA block 304 outputs an updated feature by applying a scaling and a shifting to each of the channels of the feature map $F_1$. More details of the AA block 304 are below. The updated feature output, denoted by $F_{1,af}$, is encoded with a hyperprior encoder (shown as a hyper-analysis block ($H_a$) 306, a hyper-synthesis block ($H_s$) 308, and an arithmetic encoder (AE) 310).

According to Ballé, Johannes, et al., *Variational Image Compression with a Scale Hyperprior*, arXiv preprint arXiv: 1802.01436 (2018), the hyperprior model is a popular model for learning-based compression, which uses hyper-analysis and hyper-synthesis ($H_a$ and $H_s$) blocks to estimate the distribution (D in FIG. 3) for entropy coding, The estimated distribution may be used to encode/decode the input neural network feature map. For some embodiments, blocks $H_a$ and $H_s$ have similar designs as FE and FD, respectively. They both include convolutional layers. In FIG. 3, $F_{1,af}$ is processed by the hyper-analysis block ($H_a$) 306 leading to a hyperparameter feature $F_{1,hy}$. The hyperparameter feature $F_{1,hy}$ is encoded into a bitstream $BS_2$. By passing $F_{1,hy}$ to the hyper-synthesis ($H_s$) block 308, the estimated distributions D are obtained to use with the encoding of $F_{1,af}$. The AE block 310 encodes $F_{1,af}$ according to the estimated distributions D, which leads to the output bitstream $BS_1$. Both $BS_1$ and $BS_2$ are transmitted to the decoder side for decoding.

The original motivation for using a hyperprior model was to reduce the bitrate of $BS_1$ by adaptively encoding the input feature with different distributions. However, in this application, the reason for applying the hyperprior model is to adaptively change the distribution to encode $F_{1,af}$ when the input feature map $F_1$ is scaled differently by the AA module.

For some embodiments, the hyper-analysis $H_a$ block produces a HyperParameter feature $F_{1,hy}$. For some embodiments, the hyper-synthesis $H_s$ block generates an estimated distribution D for use in entropy-encoding updated feature $F_{1,af}$. Both bitstream one, $BS_1$, and bitstream two, $BS_2$, are sent to the decoder. $BS_1$ codes updated feature $F_{1,af}$ using distribution D. $BS_2$ codes HyperParameter feature $F_{1,hy}$.

Because the HyperPrior encoding model generates a custom distribution on the fly (for entropy encoding the updated feature map $F_{1,af}$), $F_{1,af}$ is ensured to be efficiently coded even when the rate is adapted using the input value λ.

Decoder

Figure 4:
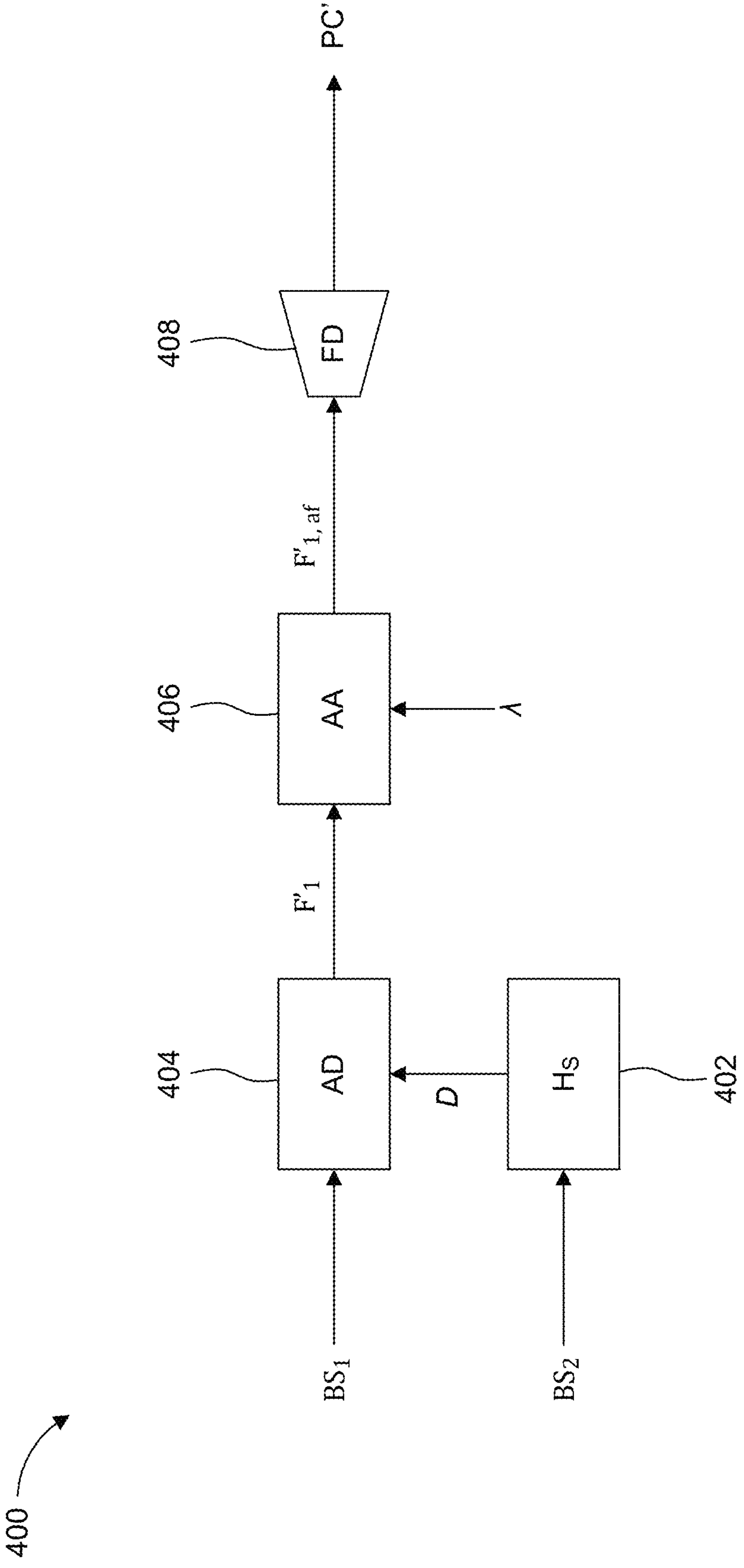
FIG. 4 is a process diagram illustrating an example decoder according to some embodiments.

FIG. 4 is a process diagram illustrating an example decoder according to some embodiments. In the decoder process 400 of FIG. 4, the hyper-synthesis block $H_s$ 402 is applied to $BS_2$ to decode the distribution parameter D. An arithmetic decoder (AD) 404 is used to decode $BS_1$ according to the distribution parameter D and output the decoded feature $$F_1'.$$

The decoded feature $$F_1'$$

is inputted into the adaptive affine (AA) block 406 (with the same 2 as on the encoder side) to obtain an affine transformed feature map $$F_{1,af}'.$$

Different from the AA module in the encoder, this AA module is to "scale back" the input feature. The affine transformed feature map, $$F_{1,af}',$$

is inputted into the feature decoding (FD) block 408 to reconstruct the decoded point cloud PC'.

Comparing FIG. 3 (encoder) with FIG. 4 (decoder), most of the decoder steps are steps that reverse the corresponding encoder steps. The only caveat is that the AA block 406 of the decoder is not the same as the AA block 304 of the encoder. The AA block 406 of the decoder is designed to "scale back" the input feature.

Adaptive Affine (AA) Block

Figure 5:
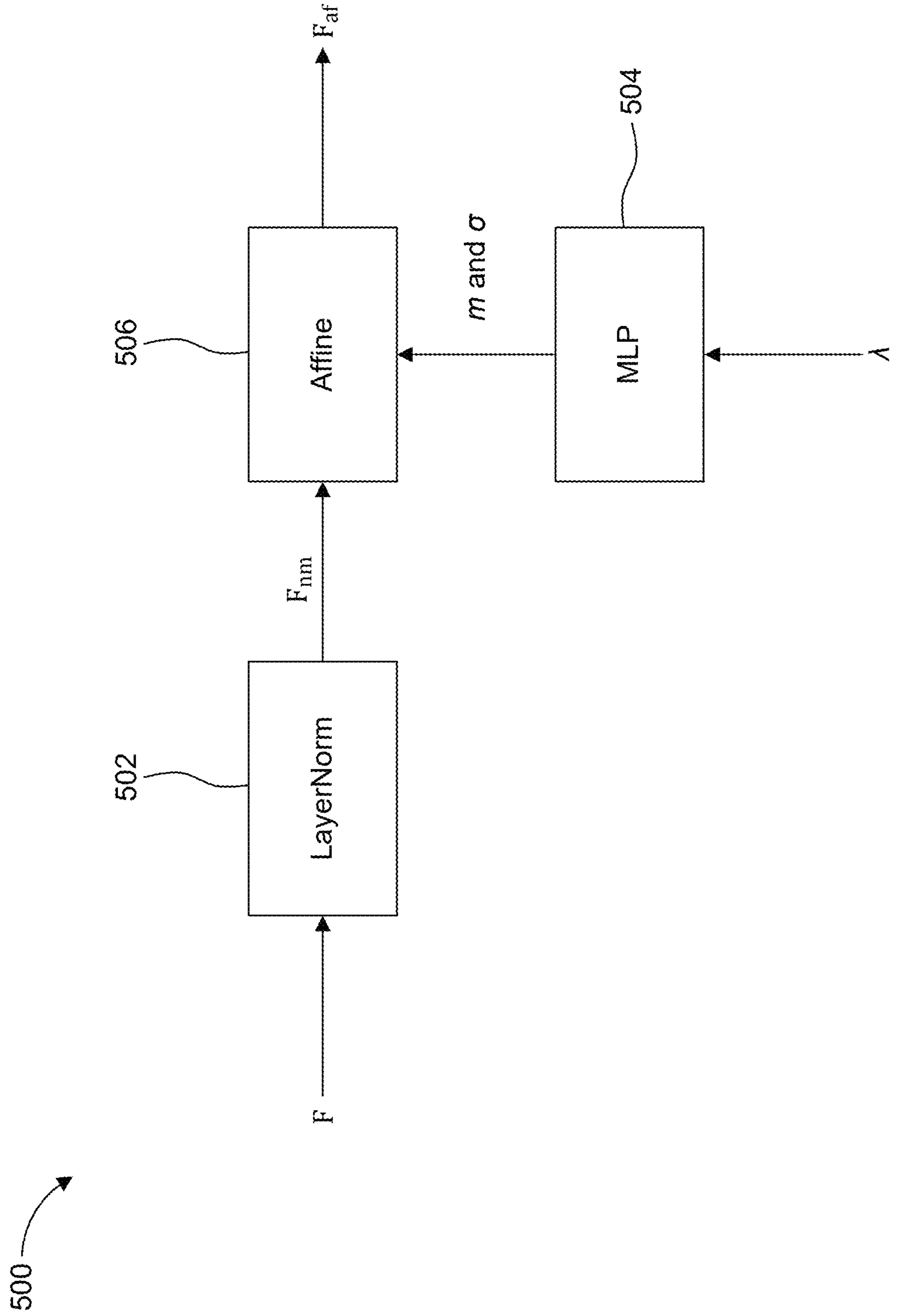
FIG. 5 is a process diagram illustrating an example adaptive affine block according to some embodiments.

FIG. 5 is a process diagram illustrating an example adaptive affine block according to some embodiments. An example design of the adaptive affine block is shown in FIG. 5. Given an input feature F and a tradeoff parameter λ, the adaptive affine model 500 learns to adaptively scale and shift each of the channels in the feature map F.

The input feature F is inputted into a "layer normalization" layer, leading to the normalized feature $F_{nm}$. See Ba, Jimmy Lei, et al., *Layer Normalization*, arXiv preprint arXiv:1607.06450 (2016) ("Ba") for a description of a "layer normalization" layer. For all the values in F, the "layer normalization" (LayerNorm) block 502 computes a mean and a standard deviation, followed by subtracting the mean and dividing by the standard deviation. Therefore, after the layer normalization, the feature map $F_{nm}$ has a mean of 0 and a standard deviation of 1.

On the other hand, the parameter A is passed through a multi-layer perceptron (MLP) block 504, which generates, for each channel in $F_{nm}$, a scaler shift m and a scaling factor $\sigma>0$. For some embodiments, the logarithm of the parameter λ is computed and passed to a positional encoding (PE) block that is used in a transformer architecture. The output of the PE block goes through an MLP block 504 to generate the scaler shift m and the scaling factor σ. See Vaswani, Ashish, et al., *Attention is All You Need*, Advances in Neural Information Processing Systems 30 (2017) for a description of a transformer architecture.

The outputs of the MLP block 504 are applied to an affine block 506. The affine clock 506 multiplies each channel of $F_{nm}$ by the associated scaling factor σ and adds the associated shift m to that channel to generate $F_{af}$.

See Duan, Zhihao, et al., *QARV: Quantization-Aware ResNet VAE for Lossy Image Compression*, IEEE Transactions on Pattern Analysis and Machine Intelligence (2023) for an example of an AA block used in other works. However, different from existing works, the current processes described herein use a hyperprior model to facilitate the linear transformation applied by the AA module, which is simple and yet effective for the rate control purpose.

Multiple Down-Up Sampling

Figure 6:
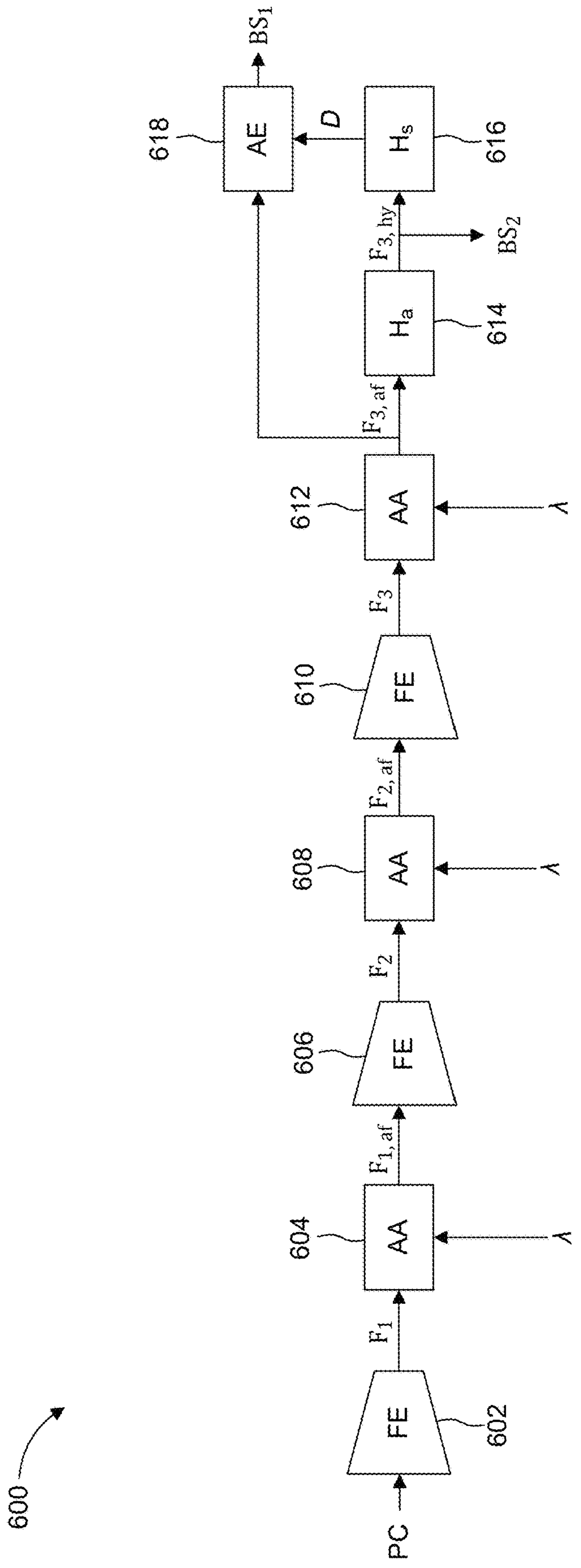
FIG. 6 is a process diagram illustrating an example encoder with multiple down-up samplings according to some embodiments.

FIG. 6 is a process diagram illustrating an example encoder with multiple down-up samplings according to some embodiments. For some embodiments, an AA block is applied at least once on the encoder side and at least once on the decoder side so that the feature may be scaled when encoding and scaled back when decoding according to the input parameter A.

However, if there are multiple times of down-up sampling in the compression pipeline (e.g., FIGS. 2A-2B), a different design may be used to make the feature scaling process more adaptive. Specifically, for some embodiments, an AA block may be inserted multiple times in the encoder, where each AA block 604, 608, 612 is associated with a respective FE block 602, 606, 610. Similarly, on the decoder side, multiple AA blocks are inserted, where each of AA block is associated with a respective FD block.

An example design of the encoder 600 with three FE blocks 602, 606, 610 is provided in FIG. 6. In this case, one AA block 604, 608, 612 is appended after each FE block 602, 606, 610. The output of the third AA block 612 is encoded with a hyperprior encoder (shown as a hyper-analysis block ($H_a$) 614, a hyper-synthesis block ($H_s$) 616, and an arithmetic encoder (AE) 618).

Comparing FIGS. 3 and 6, FIG. 6 adds two sets of an FE block 602, 606 followed by a respective AA block 604, 608.

Figure 7:
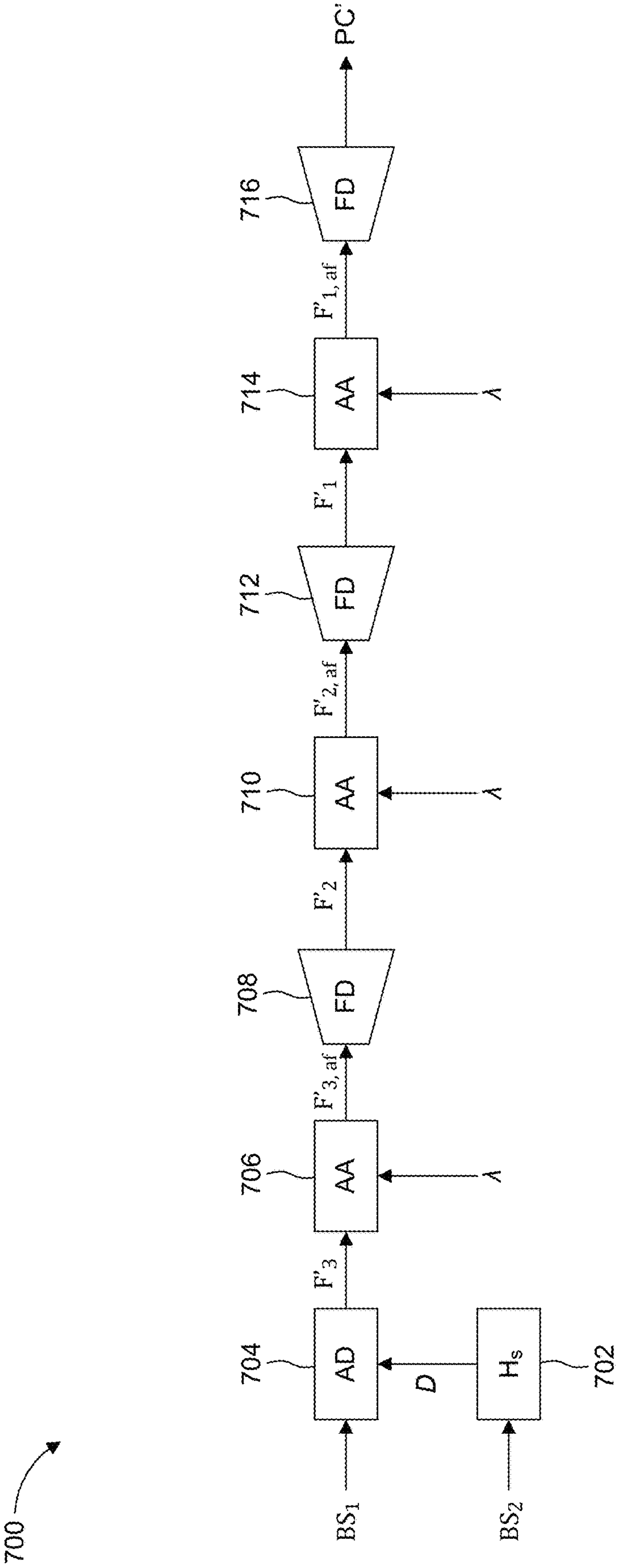
FIG. 7 is a process diagram illustrating an example decoder with multiple down-up samplings according to some embodiments.

FIG. 7 is a process diagram illustrating an example decoder with multiple down-up samplings according to some embodiments. An example design 700 of the decoder with three FD blocks 708, 712, 716 is provided in FIG. 7. In this case, one AA block 706, 710, 714 is applied before each respective FD block 708, 712, 716.

In the decoder process 700 of FIG. 7, the hyper-synthesis block $H_s$ 702 is applied to $BS_2$ to decode the distribution parameter D. An arithmetic decoder (AD) 704 is used to decode $BS_1$ according to the distribution parameter D and output the decoded feature $F'_3$, which is inputted into the first AA block 706.

Comparing FIGS. 4 and 7, FIG. 7 adds two sets of an AA block 710, 714 followed by a respective FD block 712, 716.

Figure 8:
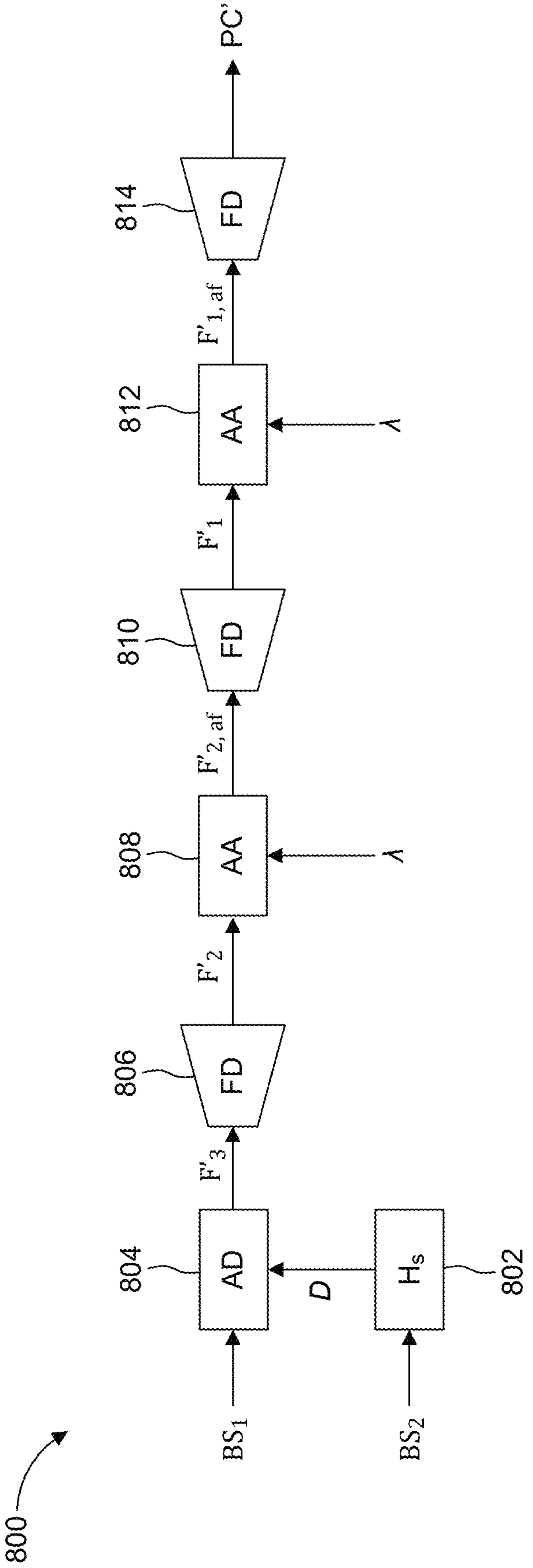
FIG. 8 is a process diagram illustrating an example decoder with multiple down-up samplings according to some embodiments.

FIG. 8 is a process diagram illustrating an example decoder with multiple down-up samplings according to some embodiments. For some embodiments of a decoder design 800, one AA block 808, 812 is appended after each respective FD block 806, 810 (similar to the encoder in FIG. 6), except for the last FD block 814. This example decoder is provided in FIG. 8, which has three FD blocks and two AA blocks. This structure of appending an AA block after another block is similar to the encoder in FIG. 6, which has an AA block after each FE block.

In the decoder process 800 of FIG. 8, the hyper-synthesis block $H_s$ 802 is applied to $BS_2$ to decode the distribution parameter D. An arithmetic decoder (AD) 804 is used to decode $BS_1$ according to the distribution parameter D and output the decoded feature $F'_3$, which is inputted into the first AA block 806.

Extension for Point-Based Neural Networks

In the example of FIGS. 3 and 4, the FE and FD blocks are 3D sparse convolutional layers that operate on top of voxel grids. However, the same methodology applies if the FE and FD blocks are point-based neural network blocks. For instance, the FE block may be replaced by a PointNet feature extractor, while the FD block may be a FoldingNet decoder. In this scenario, the methodology described above still holds.

Extension for Dynamic Point Cloud Coding

The rate control method described above may be used for dynamic point cloud coding. The hyperprior model is still be used for entropy modeling and entropy encoding/decoding. But, different from the intra coding cases shown in FIGS. 3 and 4, if the features are extracted from a reference frame, an AA block is appended after the feature extraction (FE) block.

Figure 9:
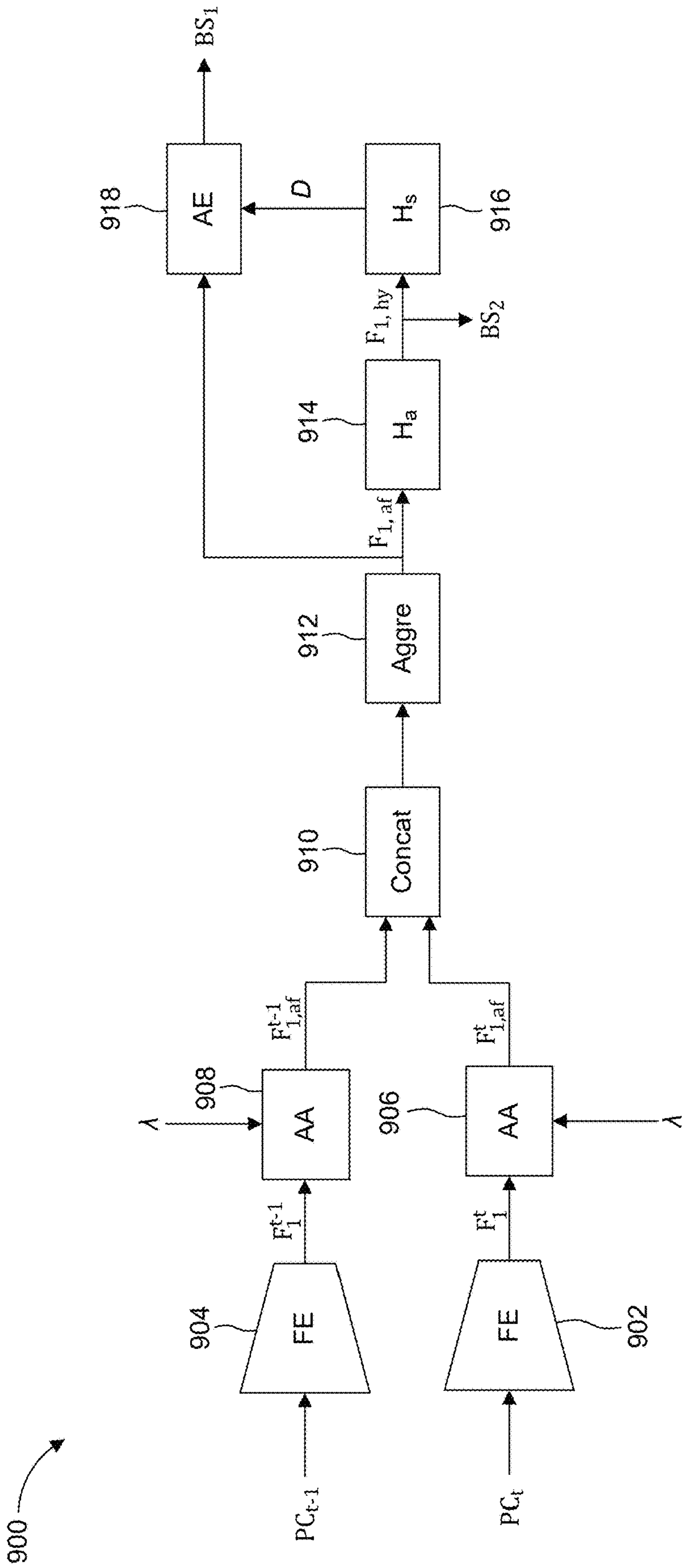
FIG. 9 is a process diagram illustrating an example encoder for dynamic coding according to some embodiments.

FIG. 9 is a process diagram illustrating an example encoder for dynamic coding according to some embodiments. In this case, the input point cloud frame, $PC_t$, is inputted into a feature extraction (FE) block 902 to extract a feature map, $$F_1^t.$$

The feature map is updated by the AA block 906, leading to a first updated feature map, $$F_{1,af}^t.$$

Similarly, the input reference frame, $PC_{t-1}$, is inputted into a feature extraction (FE) block 904 to extract a feature map, $$F_1^{t-1}.$$

The feature map is updated by the AA block 908, leading to a second updated feature map, $$F_{1,af}^{t-1}.$$

The first updated feature map, $$F_{1,af}^{t},$$

is concatenated with the second updated feature map, $$F_{1,af}^{t-1}$$

by a concatenation block 910. The concatenated output is followed by feature aggregation with an aggregation block 912 ("Aggre" in FIG. 9). In some embodiments, the aggregation block is a series of convolutional layers for feature refinement.

The rest of the steps using the hyperprior model for entropy coding are similar to those illustrated in the intra case (FIG. 3). The aggregated feature output, denoted by $F_{1,af}$, is encoded by a hyperprior encoder (shown as a hyper-analysis block ($H_a$) 914, a hyper-synthesis block ($H_s$) 916, and an arithmetic encoder (AE) 918).

Figure 10:
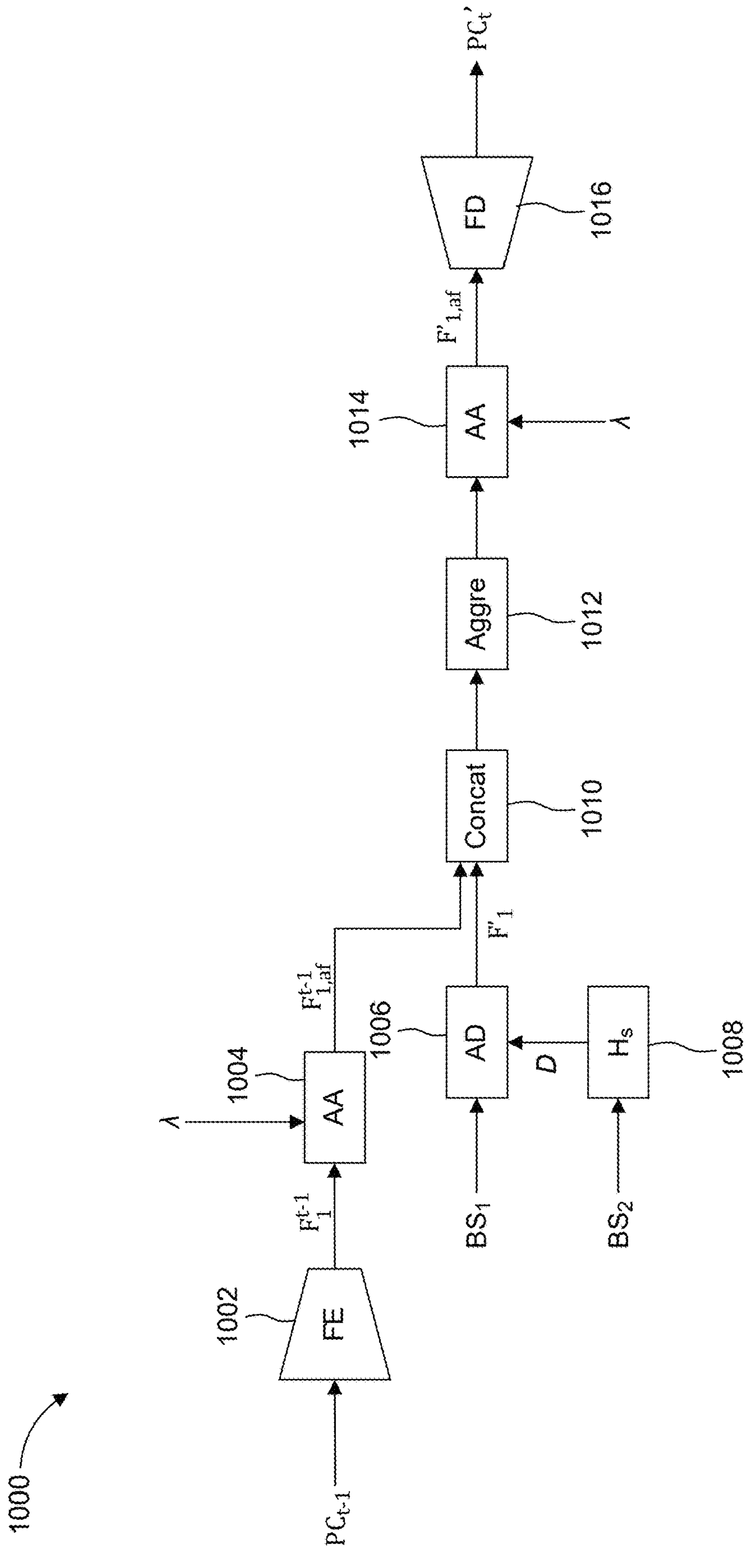
FIG. 10 is a process diagram illustrating an example decoder for dynamic coding according to some embodiments.

FIG. 10 is a process diagram illustrating an example decoder for dynamic coding according to some embodiments. An example decoder process 1000, for some embodiments, is provided in FIG. 10. Given a reference point cloud $PC_{t-1}$, its associated feature $$F_{1,af}^{t-1}$$

is extracted with the FE block 1002 and the AA block 1004. The hyper-synthesis block $H_s$ 1008 is applied to $BS_2$ to decode the distribution parameter D. An arithmetic decoder (AD) 1006 is used to decode $BS_1$ according to the distribution parameter D and output the decoded feature $$F_1^{t}.$$

The AA block output is concatenated with the decoded feature map $F'_1$ via the concatenation block 1010. The concatenated output undergoes further aggregation via the feature aggregation block 1012 ("Aggre" in FIG. 10). The rest of the steps with another AA block 1014 and an FD block 1016 for generating the decoded point cloud are similar to those illustrated in the intra case (FIG. 4).

In FIG. 10, the example branch for extracting $$F_{1,af}^{t-1}$$

is the same as that of the example encoder of FIG. 9. Moreover, for some embodiments, the rest of the blocks in FIG. 10 do not exactly reverse the steps in FIG. 9.

Figure 11:
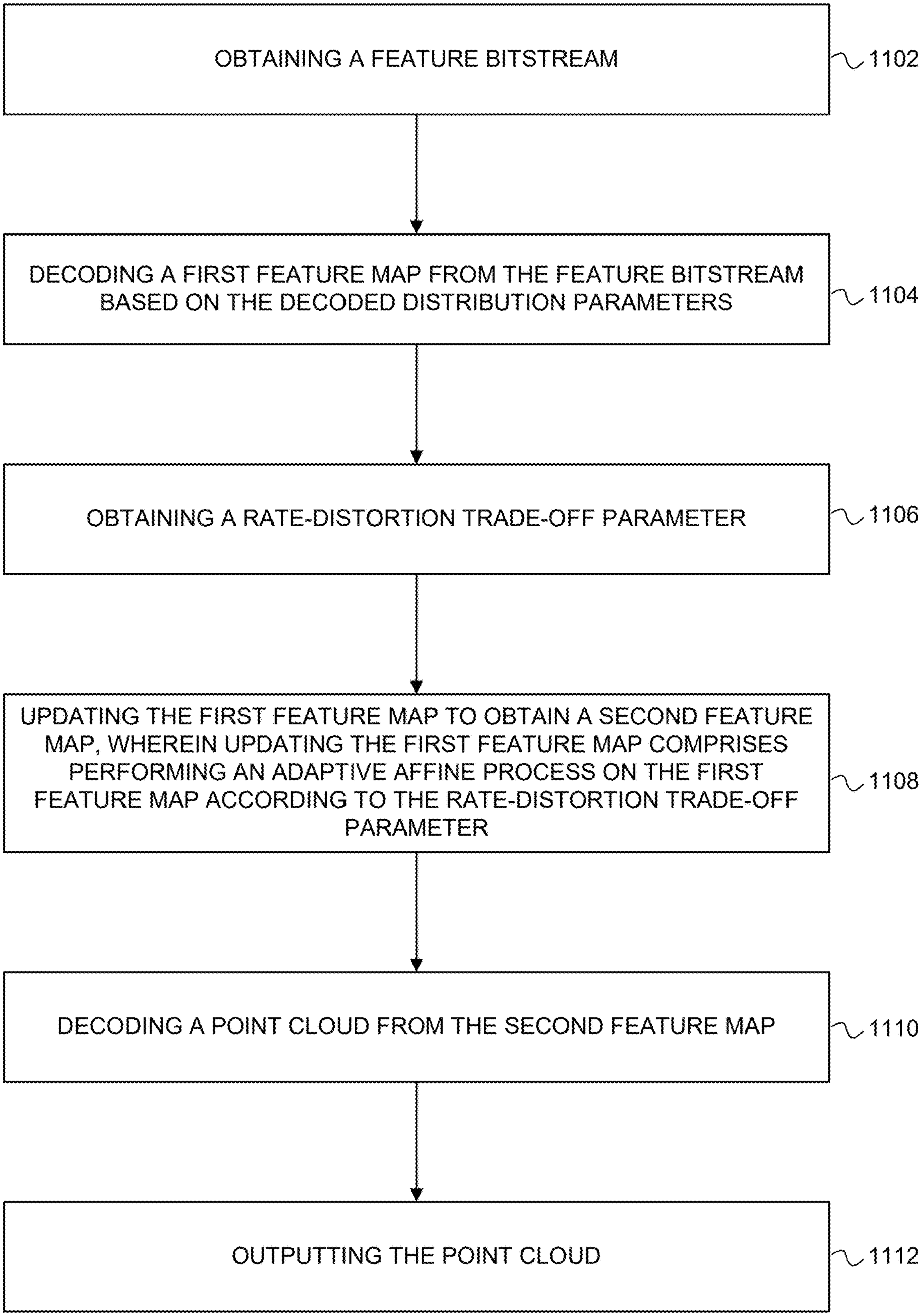
FIG. 11 is a flowchart illustrating an example process for decoding a point cloud according to some embodiments.

FIG. 11 is a flowchart illustrating an example process for decoding a point cloud according to some embodiments. For some embodiments, an example process 1100 may include obtaining 1102 a feature bitstream. For some embodiments, the example process 1100 may further include decoding 1104 a first feature map from the feature bitstream based on the decoded distribution parameters. For some embodiments, the example process 1100 may further include obtaining 1106 a rate-distortion trade-off parameter. For some embodiments, the example process 1100 may further include updating 1108 the first feature map to obtain a second feature map, wherein updating the first feature map comprises performing an adaptive affine process on the first feature map according to the rate-distortion trade-off parameter. For some embodiments, the example process 1100 may further include decoding 1110 a point cloud from the second feature map. For some embodiments, the example process 1100 may further include outputting 1112 the point cloud.

For some embodiments, an example process may include obtaining a hyperprior bitstream. For some embodiments, the example process may further include decoding one or more distribution parameters from the hyperprior bitstream. For some embodiments, these steps may be done in addition to, for example, the example process shown in FIG. 11.

For some embodiments of the example process 1100, performing a computation using a neural network layer with a rate-distortion trade-off parameter as an input may be done using a multi-layer perceptron (MLP) process. For some embodiments of the example process 1100, updating the first feature map further include: performing a computation using a neural network layer with the rate-distortion trade-off parameter as an input; and performing a layer normalization process on the first feature map to generate a normalized version of the first feature map, wherein performing the adaptive affine process is performed on the normalized version of the first feature map. For some embodiments of the example process 1100, performing the computation using a neural network layer generates, for each channel in the normalized version of the first feature map, a scaler shift m and a scaling factor σ.

Figure 12:
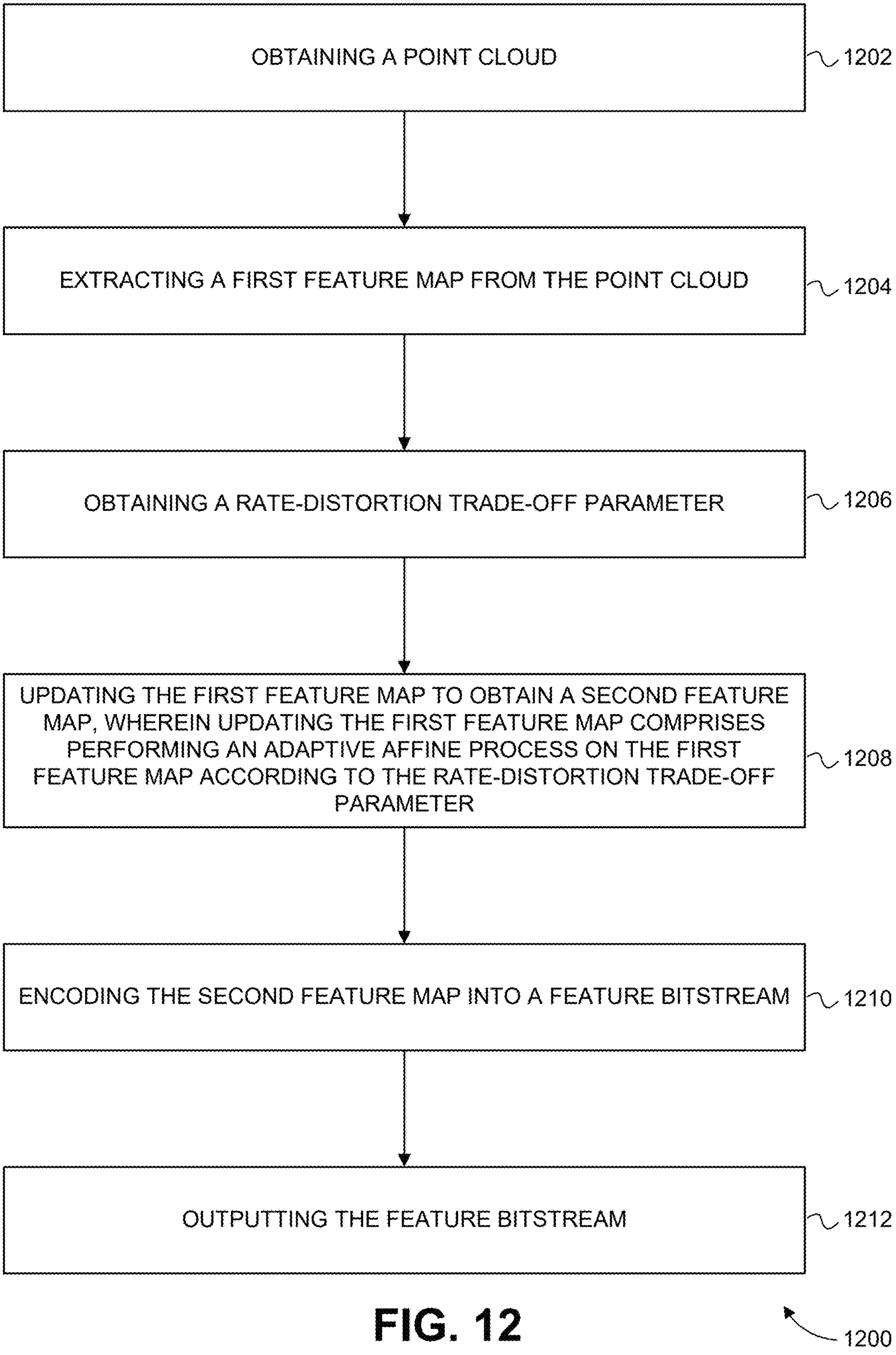
FIG. 12 is a flowchart illustrating an example process for encoding a point cloud according to some embodiments.

FIG. 12 is a flowchart illustrating an example process for encoding a point cloud according to some embodiments. For some embodiments, an example process 1200 may include obtaining 1202 a point cloud. For some embodiments, the example process 1200 may further include extracting 1204 a first feature map from the point cloud. For some embodiments, the example process 1200 may further include obtaining 1206 a rate-distortion trade-off parameter. For some embodiments, the example process 1200 may further include updating 1208 the first feature map to obtain a second feature map, wherein updating the first feature map includes performing an adaptive affine process on the first feature map according to the rate-distortion trade-off parameter. For some embodiments, the example process 1200 may further include encoding 1210 the second feature map into a feature bitstream. For some embodiments, the example process 1200 may further include outputting 1212 the feature bitstream.

For some embodiments, the example process 1200 of FIG. 12 may further include applying a hyperprior encoder to the second feature map to generate a hyperprior bitstream. For some embodiments, the example process 1200 of FIG. 12 may further include outputting the hyperprior bitstream. For some embodiments, the example process 1200 of FIG. 12 may further include performing an MLP process that generates, for each channel in the normalized version of the first feature map, a scaler shift m and a scaling factor σ.

An example apparatus in accordance with some embodiments may include at least one processor configured to perform any one of the methods described within this application. An example apparatus in accordance with some embodiments may include a computer-readable medium storing instructions for causing one or more processors to perform any one of the methods described within this application. An example apparatus in accordance with some embodiments may include at least one processor and at least one non-transitory computer-readable medium storing instructions for causing the at least one processor to perform any one of the methods described within this application. An example signal in accordance with some embodiments may include a bitstream generated according to any one of the methods described within this application.

While the methods and systems in accordance with some embodiments are generally discussed in context of extended reality (XR), some embodiments may be applied to any XR contexts such as, e.g., virtual reality (VR)/mixed reality (MR)/augmented reality (AR) contexts. Also, although the term "head mounted display (HMD)" is used herein in accordance with some embodiments, some embodiments may be applied to a wearable device (which may or may not be attached to the head) capable of, e.g., XR, VR, AR, and/or MR for some embodiments.

A first example method in accordance with some embodiments may include: obtaining a feature bitstream; decoding a first feature map from the feature bitstream; obtaining a rate-distortion trade-off parameter; updating the first feature map to obtain a second feature map, wherein updating the first feature map includes performing an adaptive affine process on the first feature map according to the rate-distortion trade-off parameter; decoding a point cloud from the second feature map; and outputting the point cloud.

For some embodiments of the first example method, the adaptive affine process further includes scaling values of each respective channel of the first feature map by a scaling factor $\sigma$ associated with the respective channel.

For some embodiments of the first example method, the adaptive affine process further includes shifting values of each respective channel of the first feature map by a scalar shift m associated with the respective channel.

Some embodiments of the first example method may further include rendering the point cloud in an immersive environment.

For some embodiments of the first example method, updating the first feature map further includes: performing a computation using a neural network layer with the rate-distortion trade-off parameter as an input; and performing a layer normalization process on the first feature map to generate a normalized version of the first feature map, wherein performing the adaptive affine process is performed on the normalized version of the first feature map.

For some embodiments of the first example method, performing the computation using a neural network layer generates, for each channel in the normalized version of the first feature map, a scaler shift m and a scaling factor $\sigma$.

Some embodiments of the first example method may further include performing a feature refinement process one or more times, wherein the feature refinement process includes: updating the first refinement feature map to obtain a second refinement feature map, wherein updating the first refinement feature map includes performing an adaptive affine process on the first refinement feature map according to the rate-distortion trade-off parameter; and decoding a third refinement feature map from the second refinement feature map, wherein the first refinement feature map is the first feature map for a first pass through the feature refinement process, and setting the first feature map equal to the third refinement feature map after a last pass through the feature refinement process.

For some embodiments of the first example method, decoding the point cloud from the second feature map includes performing a feature decoding process on the second feature map.

Some embodiments of the first example method may further include: concatenating a reference feature map with the first feature map to generate a concatenated feature map; aggregating the concatenated feature map; and setting the first feature map to be equal to the aggregated feature map.

Some embodiments of the first example method may further include: obtaining a reference point cloud; performing a feature encoding on the reference point cloud to generate a preliminary reference feature map; and performing a reference adaptive affine process on the preliminary reference feature map according to the rate-distortion trade-off parameter, wherein an output of the adaptive affine process is the reference feature map.

For some embodiments of the first example method, the reference adaptive affine process performed on the preliminary reference feature map is identical to the adaptive affine process performed on the first feature map.

A first example apparatus in accordance with some embodiments may include: a processor; and a memory storing instructions operative, when executed by the processor, to cause the apparatus to: obtain a feature bitstream; decode a first feature map from the feature bitstream; obtain a rate-distortion trade-off parameter; update the first feature map to obtain a second feature map, wherein updating the first feature map includes performing an adaptive affine process on the first feature map according to the rate-distortion trade-off parameter; decode a point cloud from the second feature map; and output the point cloud.

A second example method in accordance with some embodiments may include: obtaining a point cloud; extracting a first feature map from the point cloud; obtaining a rate-distortion trade-off parameter; updating the first feature map to obtain a second feature map, wherein updating the first feature map includes performing an adaptive affine process on the first feature map according to the rate-distortion trade-off parameter; encoding the second feature map into a feature bitstream; and outputting the feature bitstream.

For some embodiments of the second example method, updating the first feature map further includes: performing a multi-layer perceptron (MLP) process using the rate-distortion trade-off parameter; and performing a layer normalization process on the first feature map to generate a normalized version of the first feature map, wherein performing the adaptive affine process is performed on the normalized version of the first feature map.

Some embodiments of the second example method may further include: performing a feature refinement process one or more times, wherein the feature refinement process includes: updating the first refinement feature map to obtain a second refinement feature map, wherein updating the first refinement feature map includes performing an adaptive affine process on the first refinement feature map according to the rate-distortion trade-off parameter; and decoding a third refinement feature map from the second refinement feature map, wherein the first refinement feature map is the first feature map for a first pass through the feature refinement process, and setting the first feature map equal to the third refinement feature map after a last pass through the feature refinement process.

For some embodiments of the second example method, extracting a first feature map from the point cloud includes performing a feature encoding process on the point cloud.

Some embodiments of the second example method may further include: concatenating a reference feature map with the second feature map to generate a concatenated feature map; aggregating the concatenated feature map; and setting the second feature map to be equal to the aggregated feature map Some embodiments of the second example method may further include: obtaining a reference point cloud; performing a feature encoding on the reference point cloud to generate a preliminary reference feature map; and performing a reference adaptive affine process on the preliminary reference feature map according to the rate-distortion tradeoff parameter, wherein an output of the adaptive affine process is the reference feature map.

For some embodiments of the second example method, the reference adaptive affine process performed on the preliminary reference feature map is identical to the adaptive affine process performed on the first feature map.

For some embodiments of the second example method, applying the hyperprior encoder to the second feature map includes: performing a hyperprior analysis process on the second feature map to generate a third feature map; generating the hyperprior bitstream from the third feature map; performing a hyperprior synthesis process on the third feature map to generate one or more distribution parameters; and arithmetically encoding the second feature map based on the one or more distribution parameters to generate the feature bitstream.

This disclosure describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the disclosure or scope of those aspects. Indeed, all of the different aspects can be combined and interchanged to provide further aspects. Moreover, the aspects can be combined and interchanged with aspects described in earlier filings as well.

Various numeric values may be used in the present disclosure, for example. The specific values are for example purposes and the aspects described are not limited to these specific values.

Embodiments described herein may be carried out by computer software implemented by a processor or other hardware, or by a combination of hardware and software. As a non-limiting example, the embodiments can be implemented by one or more integrated circuits. The processor can be of any type appropriate to the technical environment and can encompass one or more of microprocessors, general purpose computers, special purpose computers, and processors based on a multi-core architecture, as non-limiting examples.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this disclosure are not necessarily all referring to the same embodiment.

Additionally, this disclosure may refer to "determining" various pieces of information. Determining the information can include one or more of, for example, estimating the information, calculating the information, predicting the information, or retrieving the information from memory.

Further, this disclosure may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this disclosure may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items as are listed.

Implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method comprising:
obtaining a feature bitstream;
decoding a first feature map from the feature bitstream;
obtaining a rate-distortion trade-off parameter;
obtaining a reference point cloud;
performing a feature encoding on the reference point cloud to generate an encoded feature map;
updating the encoded feature map to obtain a second feature map,
wherein updating the encoded feature map comprises performing an adaptive affine process on the encoded feature map according to the rate-distortion trade-off parameter;
concatenating the first feature map with the second feature map to generate a concatenated feature map;
setting the first feature map to be equal to the concatenated feature map;
updating the first feature map to obtain a third feature map,
wherein updating the first feature map comprises performing the adaptive affine process on the first feature map according to the rate-distortion trade-off parameter;
decoding a point cloud from the third feature map; and
outputting the point cloud.

2. The method of claim 1, wherein the adaptive affine process further comprises scaling values of each respective channel of the first feature map by a scaling factor σ associated with the respective channel.

3. The method of claim 1, wherein the adaptive affine process further comprises shifting values of each respective channel of the first feature map by a scalar shift m associated with the respective channel.

4. The method of claim 1, further comprising rendering the point cloud in an immersive environment.

5. The method of claim 1, wherein updating the first feature map further comprises:
performing a computation using a neural network layer with the rate-distortion trade-off parameter as an input; and
performing a layer normalization process on the first feature map to generate a normalized version of the first feature map,
wherein performing the adaptive affine process is performed on the normalized version of the first feature map.

6. The method of claim 5, wherein performing the computation using a neural network layer generates, for each channel in the normalized version of the first feature map, a scaler shift m and a scaling factor σ.

7. The method of claim 1, further comprising:
performing a feature refinement process one or more times,
wherein the feature refinement process comprises:
updating the first refinement feature map to obtain a second refinement feature map,
wherein updating the first refinement feature map comprises performing an adaptive affine process on the first refinement feature map according to the rate-distortion trade-off parameter; and
decoding a third refinement feature map from the second refinement feature map,
wherein the first refinement feature map is the first feature map for a first pass through the feature refinement process, and
setting the first feature map equal to the third refinement feature map after a last pass through the feature refinement process.

8. The method of claim 1, wherein decoding the point cloud from the third feature map comprises performing a feature decoding process on the third feature map.

9. The method of claim 1, further comprising:
aggregating the concatenated feature map; and
setting the first feature map to be equal to the aggregated feature map.

10. The method of claim 1, wherein performing the adaptive affine process on the encoded feature map outputs the reference feature map.

11. The method of claim 10, wherein the reference adaptive affine process performed on the preliminary reference feature map is identical to the adaptive affine process performed on the first feature map.

12. An apparatus comprising:

a processor; and a memory storing instructions operative, when executed by the processor, to cause the apparatus to:

obtain a feature bitstream;

decode a first feature map from the feature bitstream;

obtain a rate-distortion trade-off parameter;

obtain a reference point cloud;

perform a feature encoding on the reference point cloud to generate an encoded feature map;

update the encoded feature map to obtain a second feature map, wherein updating the encoded feature map comprises performing an adaptive affine process on the encoded feature map according to the rate-distortion trade-off parameter;

concatenate the first feature map with the second feature map to generate a concatenated feature map;

set the first feature map to be equal to the concatenated feature map;

update the first feature map to obtain a third feature map, wherein updating the first feature map comprises performing the adaptive affine process on the first feature map according to the rate-distortion trade-off parameter;

decode a point cloud from the third feature map; and output the point cloud.

13. A method comprising:

obtaining a point cloud;

extracting a first feature map from the point cloud;

obtaining a rate-distortion trade-off parameter;

obtaining a reference point cloud;

performing a feature encoding on the reference point cloud to generate an encoded feature map;

updating the encoded feature map to obtain a second feature map, wherein updating the encoded feature map comprises performing an adaptive affine process on the encoded feature map according to the rate-distortion trade-off parameter;

concatenating the first feature map with the second feature map to generate a concatenated feature map;

setting the first feature map to be equal to the concatenated feature map;

updating the first feature map to obtain a third feature map, wherein updating the first feature map comprises performing the adaptive affine process on the first feature map according to the rate-distortion trade-off parameter;

encoding the third feature map into a feature bitstream; and outputting the feature bitstream.

14. The method of claim 13, wherein updating the first feature map further comprises:

performing a multi-layer perceptron (MLP) process using the rate-distortion trade-off parameter; and performing a layer normalization process on the first feature map to generate a normalized version of the first feature map, wherein performing the adaptive affine process is performed on the normalized version of the first feature map.

15. The method of claim 13, further comprising:

performing a feature refinement process one or more times, wherein the feature refinement process comprises:

updating the first refinement feature map to obtain a second refinement feature map, wherein updating the first refinement feature map comprises performing an adaptive affine process on the first refinement feature map according to the rate-distortion trade-off parameter; and decoding a third refinement feature map from the second refinement feature map, wherein the first refinement feature map is the first feature map for a first pass through the feature refinement process, and setting the first feature map equal to the third refinement feature map after a last pass through the feature refinement process.

16. The method of claim 13, wherein extracting a first feature map from the point cloud comprises performing a feature encoding process on the point cloud.

17. The method of claim 13, further comprising:

aggregating the concatenated feature map; and setting the first feature map to be equal to the aggregated feature map.

18. The method of claim 13, wherein performing the adaptive affine process on the encoded feature map outputs the reference feature map.

19. The method of claim 18, wherein the reference adaptive affine process performed on the preliminary reference feature map is identical to the adaptive affine process performed on the first feature map.

20. The method of claim 13, further comprising:

applying a hyperprior encoding to the third feature map, wherein applying the hyperprior encoding to the third feature map comprises:

performing a hyperprior analysis process on the second third feature map to generate a third feature map;

generating the hyperprior bitstream from the third feature map;

performing a hyperprior synthesis process on the third feature map to generate one or more distribution parameters; and arithmetically encoding the third feature map based on the one or more distribution parameters to generate the feature bitstream.

21. An apparatus comprising:

a processor; and a memory storing instructions operative, when executed by the processor, to cause the apparatus to:

obtain a point cloud;

extract a first feature map from the point cloud;

obtain a rate-distortion trade-off parameter;

obtain a reference point cloud;

perform a feature encoding on the reference point cloud to generate an encoded feature map;

update the encoded feature map to obtain a second feature map, wherein updating the encoded feature map comprises performing an adaptive affine process on the encoded feature map according to the rate-distortion trade-off parameter;

concatenate the first feature map with the second feature map to generate a concatenated feature map;

set the first feature map to be equal to the concatenated feature map;

update the first feature map to obtain a third feature map, wherein updating the first feature map comprises performing the adaptive affine process on the first feature map according to the rate-distortion trade-off parameter;

encode the third feature map into a feature bitstream; and output the feature bitstream.

* * * * *